(12) United States Patent
Wang et al.

(10) Patent No.: US 10,447,173 B2
(45) Date of Patent: Oct. 15, 2019

(54) SINGLE-PHASE FIVE-LEVEL ACTIVE CLAMPING CONVERTER UNIT AND CONVERTER

(71) Applicants: Hongliang Wang, Hefei (CN); Yan-Fei Liu, Kingston (CA)

(72) Inventors: Hongliang Wang, Hefei (CN); Yan-Fei Liu, Kingston (CA)

( * ) Notice: Subject to any disclaimer, the term of this patent is extended or adjusted under 35 U.S.C. 154(b) by 0 days.

(21) Appl. No.: 15/770,493

(22) PCT Filed: Mar. 17, 2017

(86) PCT No.: PCT/CN2017/077144
§ 371 (c)(1),
(2) Date: Apr. 23, 2018

(87) PCT Pub. No.: WO2017/157338
PCT Pub. Date: Sep. 21, 2017

(65) Prior Publication Data
US 2019/0058416 A1    Feb. 21, 2019

Related U.S. Application Data

(60) Provisional application No. 62/309,773, filed on Mar. 17, 2016.

(51) Int. Cl.
*H02M 7/00* (2006.01)
*H02M 7/487* (2007.01)
*H02M 7/48* (2007.01)
*H02S 40/32* (2014.01)
*H02M 7/537* (2006.01)

(52) U.S. Cl.
CPC ............. *H02M 7/487* (2013.01); *H02M 7/48* (2013.01); *H02M 7/537* (2013.01); *H02S 40/32* (2014.12); *Y02E 10/56* (2013.01)

(58) Field of Classification Search
CPC ............ H02M 7/04; H02M 7/08; H02M 7/12; H02M 7/217; H02M 7/219; H02M 7/42; H02M 7/44; H02M 7/48; H02M 7/483; H02M 7/487; H02M 7/537; H02M 7/5387; H02M 7/5388; H02M 7/797
See application file for complete search history.

(56) References Cited

U.S. PATENT DOCUMENTS

2015/0333522 A1*  11/2015  Wang ..................... H02M 7/483
                                                                          307/43
2016/0268924 A1*   9/2016  Fu .......................... H02M 7/483

* cited by examiner

*Primary Examiner* — Adolf D Berhane
*Assistant Examiner* — Afework S Demisse

(57) ABSTRACT

A single-phase five-level active clamping converter unit and a converter. The single-phase five-level active clamping converter unit has three input ends and one output end, and also comprises: a suspension capacitor and a topological control portion. The topological control portion is connected to the suspension capacitor and the three input ends and one output end of the single-phase five-level active clamping converter unit, is connected to a plurality of control ends, and is suitable for the supply of at least eight operating modes under the control of a control signal accessing the control ends. In the single-phase five-level active clamping converter unit, a topological structure is easy to design, and is simple and convenient to control.

19 Claims, 16 Drawing Sheets ained as there are eight controllable switches in each type of traditional topologies. It can reduce the number of controllable switches in each type of traditional topologies.

SINGLE-PHASE FIVE-LEVEL ACTIVE CLAMPING CONVERTER UNIT AND CONVERTER

This application is a 35 U.S.C. 371 of International Patent Application No. PCT/CN2017/077144, filed on Mar. 17, 2017, and claims the benefit of the filing date of U.S. Application No. 62/309,773, filed on Mar. 17, 2016. The contents of both applications are incorporated herein by reference in their entirety.

FIELD OF THE INVENTION

The invention relates to five-level converter, especially five-level active neutral-point clamped converter.

BACKGROUND

Multilevel converters, especially inverters have been used for power conversion in high-power applications such as medium voltage grid (2.3 KV, 3.3 KV, or 6.9 KV) to reduce the switch voltage stress, and photovoltaic (PV) applications to reduce the filter size. Compared to two-level voltage source converters, the advantages of multilevel converters are lower voltage stress, higher efficiency, smaller filter size and lower common-mode voltage.

There are three types of traditional five-level topologies: the neutral-point-clamped (NPC) type shown in FIG. 1(a), flying-capacitor (FC) type shown in FIG. 1(b), and cascaded H-bridge (CHB) type shown in FIG. 1(c). It can be seen from the FIG. 1, there are eight controllable switches in each type of traditional topologies. The number of controllable switches is so big that it increases the cost. For the five-level NPC topologies, they generate more voltage levels from the neutral point voltage by adopting diodes. The drawback is the increasing number of switching devices and diodes when the number of voltage level increases. The FC type outputs voltage levels by using the flying-capacitor as part of power supply. However, more voltage levels need more flying-capacitors and more complexity of control strategy to balance the voltage of each flying-capacitor. The CHB multilevel converters use series-connected H-bridge cells with an isolated DC voltage source connected to each cell. Similarly, to output more voltage levels, more cells are needed. This will lead to impracticality of this type of topology since more DC sources are required.

Active-neutral-point-clamped (ANPC) converter is of multilevel topology. It combines the features of NPC and FC topology. The ANPC topology is attracting more and more attention nowadays because of high efficiency and multi-level output. Eight controllable semiconductor switches are used in the present five-level ANPC topology. That is to say, the number of controllable semiconductor switches is big. So they have high cost.

SUMMARY

To solve the above problems, provided in the invention is five-level active neutral-point clamped converter with fewer controllable semiconductor switches. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

According to a first aspect of the invention, there is provided a single phase five-level active neutral-point clamped converter unit. It has three input terminals and one output terminal. It comprises: six bidirectional switches, a flying capacitor and two diodes.

The first terminal of the first bidirectional switch is connected to a first input terminal and the second terminal of the first bidirectional switch is connected to both the first terminal of the second bidirectional switch and the positive terminal of the flying capacitor. The second terminal of the second bidirectional switch is connected to both the first terminal of the third bidirectional switch and the output terminal. The second terminal of the third bidirectional switch is connected to both the first terminal of the fourth bidirectional switch and the negative terminal of the flying capacitor. The second terminal of the fourth bidirectional switch is connected to a second input terminal. The first terminal of the fifth bidirectional switch is connected to the positive terminal of the flying capacitor and the second terminal of the fifth bidirectional switch is connected to the positive terminal of the first diode. The second terminal of the sixth bidirectional switch is connected to the negative terminal of the flying capacitor and the first terminal of the sixth bidirectional switch is connected to the negative terminal of the second diode. The negative terminal of the first diode is connected to both the positive terminal of the second diode and a third input terminal.

In some embodiments, the single phase five-level active neutral-point clamped converter unit further comprises a switch unit. The switch unit is connected between the positive terminal of the first diode and the negative terminal of the second diode.

The switch unit has many implementations. It can comprise single direction conduction and controllable switch, such as controllable semiconductor switch IGBT. The first terminal of the switch is connected to the negative terminal of the second diode and the second terminal of the switch is connected to the positive terminal of the first diode. It can also comprise bidirectional conduction switch, such as one controllable semiconductor switch IGBT with a reversely parallel diode, or one MOSFET where the parallel diode is inherent.

In some embodiments, the single phase five-level active neutral-point clamped converter unit further comprises a filtering inductor. The filtering inductor is connected between the output terminal and AC utilities or AC load.

According to a second aspect of the invention, there is provided a single phase five-level active neutral-point clamped converter. It comprise one single phase five-level active neutral-point clamped converter unit provided in the first aspect of the invention and two DC power supplies connected serially. The first input terminal is connected to the positive terminal of a first DC power supply; the second input terminal is connected to the negative terminal of a second DC power supply; the third input terminal is connected to both the common terminal of the two DC power supplies and AC utilities or AC load.

According to a third aspect of the invention, there is provided three-phase five-level active neutral-point clamped converter. It comprises three single phase five-level active neutral-point clamped converter units provided in the first aspect of the invention. The three single phase five-level active neutral-point clamped converter units are connected in parallel at their input sides. The output terminals of the three single phase five-level active neutral-point clamped converter units are respectively connected to three phases of AC utilities or AC load.

Disclosed is five-level active neutral-point clamped converter unit and thereof converter, including the single phase and the three-phase, wherein the cost is reduced because of fewer controllable semiconductor switches. It has the advantages of both the traditional neutral-point-clamped (NPC) converter and the flying-capacitor (FC) multilevel converter.

The five-level active neutral-point clamped converter provided in the invention can be used for, but not limited to, renewable energy power system, such as single-phase or three-phase photovoltaic system.

BRIEF DESCRIPTION OF THE DRAWINGS

In order to clearly present this invention, the circuit implementations discussed in the invention are accompanied with the following drawing.

For convenience in description, identical components have been given the same reference numbers in the various drawings. The same symbols like "V" as used in one drawing are intended to refer to be connected with each other.

DETAILED DESCRIPTION OF EMBODIMENTS

Provided herein is five-level active neutral-point clamped converter. For a better understanding of the invention, and to show more clearly how it may be carried into effect, embodiments will be described in detail with reference of the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

As shown in figures below, the term "PV" as used herein is intended to refer to photovoltaic modules (i.e. DC power supply), $U_{PV}$ is its DC output voltage, $C_1$ is a first capacitor which acts as the first DC power supply, $C_2$ is a second capacitor which acts as the second DC power supply and $C_s$ is the flying capacitor.

Of course, the PV is able to be replaced by other DC power supplies. That is to say, the DC power supply is not limited to PV in the invention.

For the purpose of this description, diode will be used below as a non-limiting example for all the elements characterized by single directional conduction in the invention. The positive terminal of diode is referred to Anode and the negative terminal is Cathode. It will be understood that other suitable devices may be used for the elements in the invention.

For the purpose of this description, the switch MOSFET will be used as a non-limiting example for all the semiconductor switches characterized by controllable conduction in the invention. Take the N-channel MOSFET for example. The first terminal of N-channel MOSFET is referred to Drain, the second terminal is Source and the control terminal is Gate. The control terminal of each semiconductor switch in the invention is provided with its own control signal. For the sake of brevity, it is not described repeatedly below. It will be understood that other suitable devices, such as, for example, IGBT may be used for the semiconductor switches characterized by controllable conduction in the invention.

To make sure the current in the branch of each semiconductor switch located flows in both directions, each semiconductor switch in the invention is reversely connected in parallel with a diode. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

Embodiments below will be described in detail with reference of the accompanying drawings.

Figure 1:
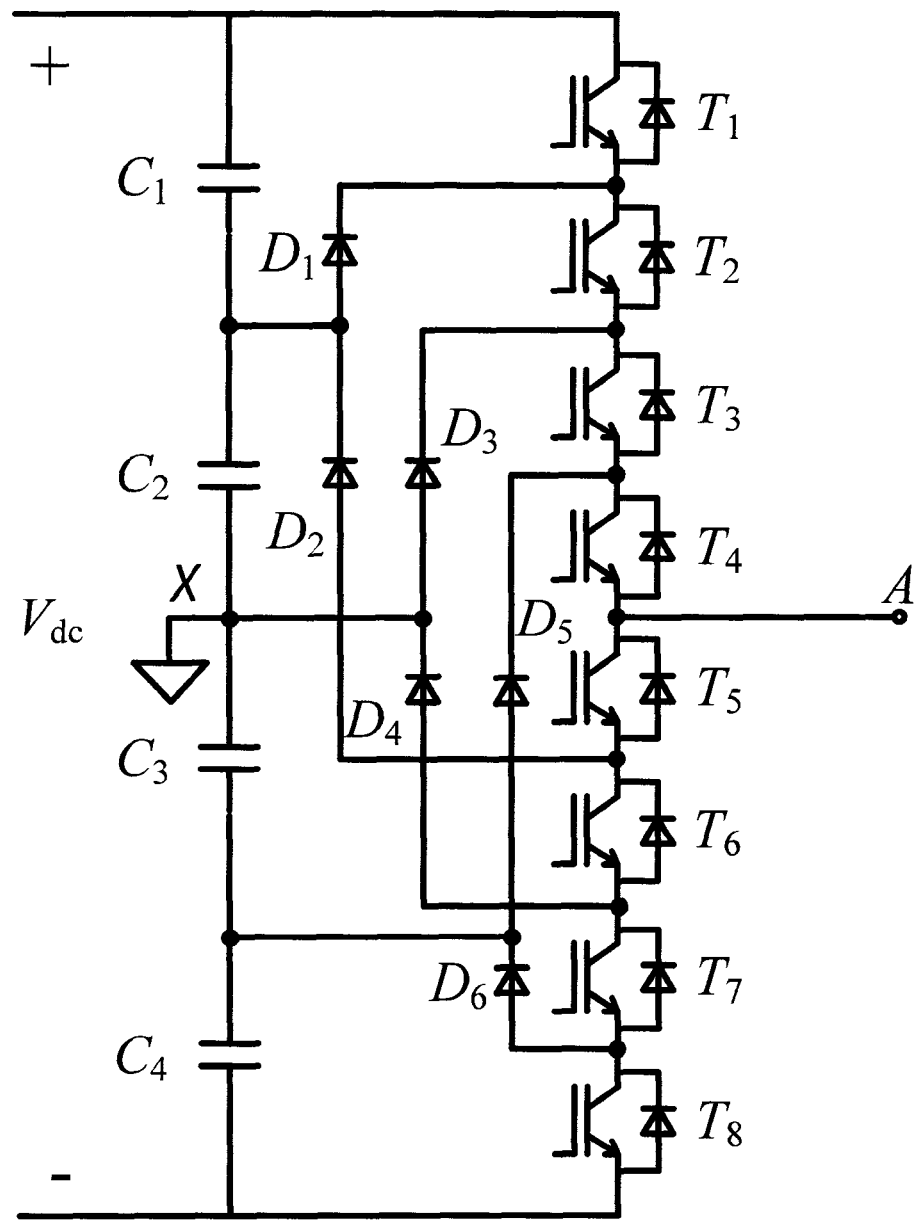
FIG. 1(a) is the circuit diagram of a first traditional five-level converter topology.
FIG. 1(b) is the circuit diagram of a second traditional five-level converter topology.
FIG. 1(c) is the circuit diagram of a third traditional five-level converter topology.
Figure 1:
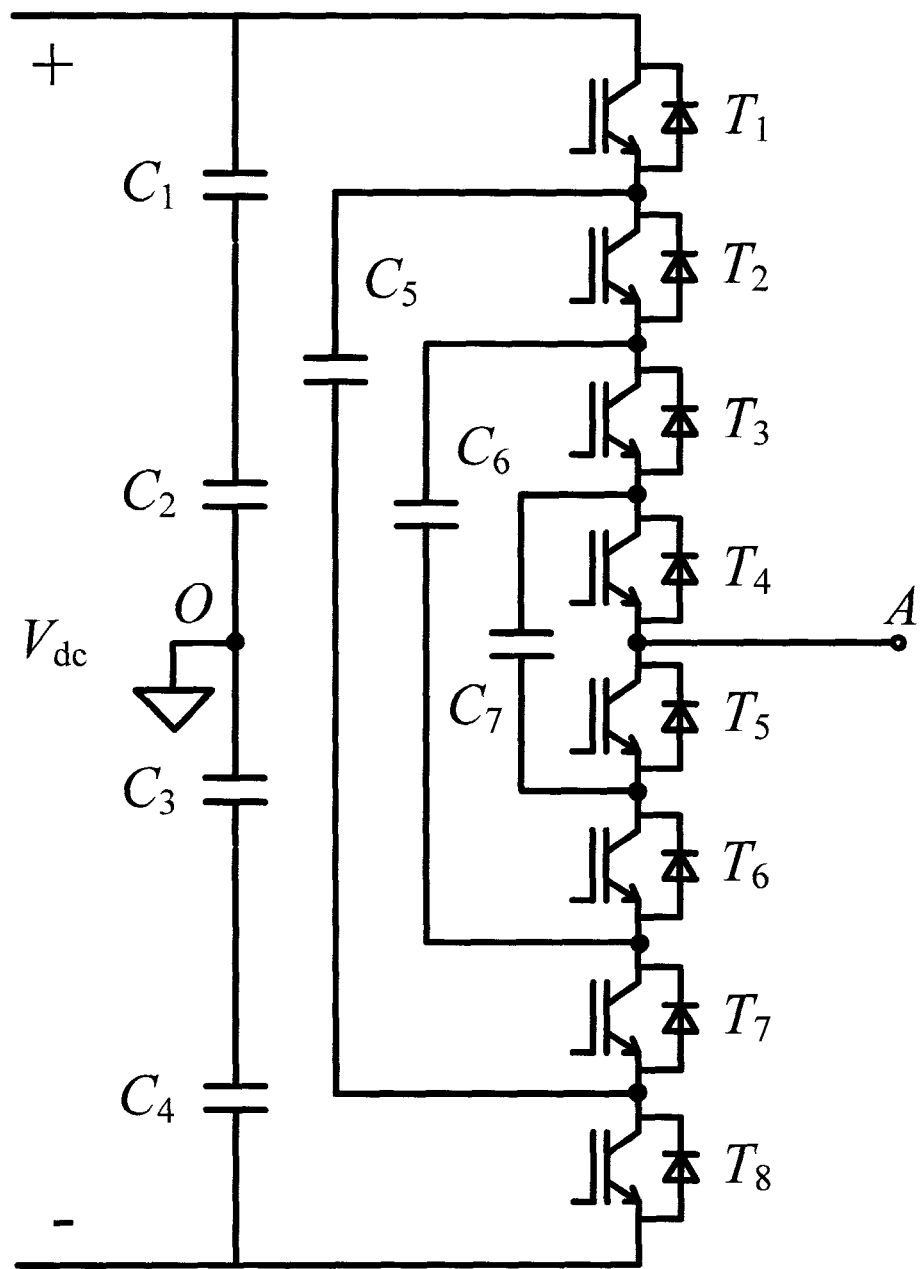
Figure 1:
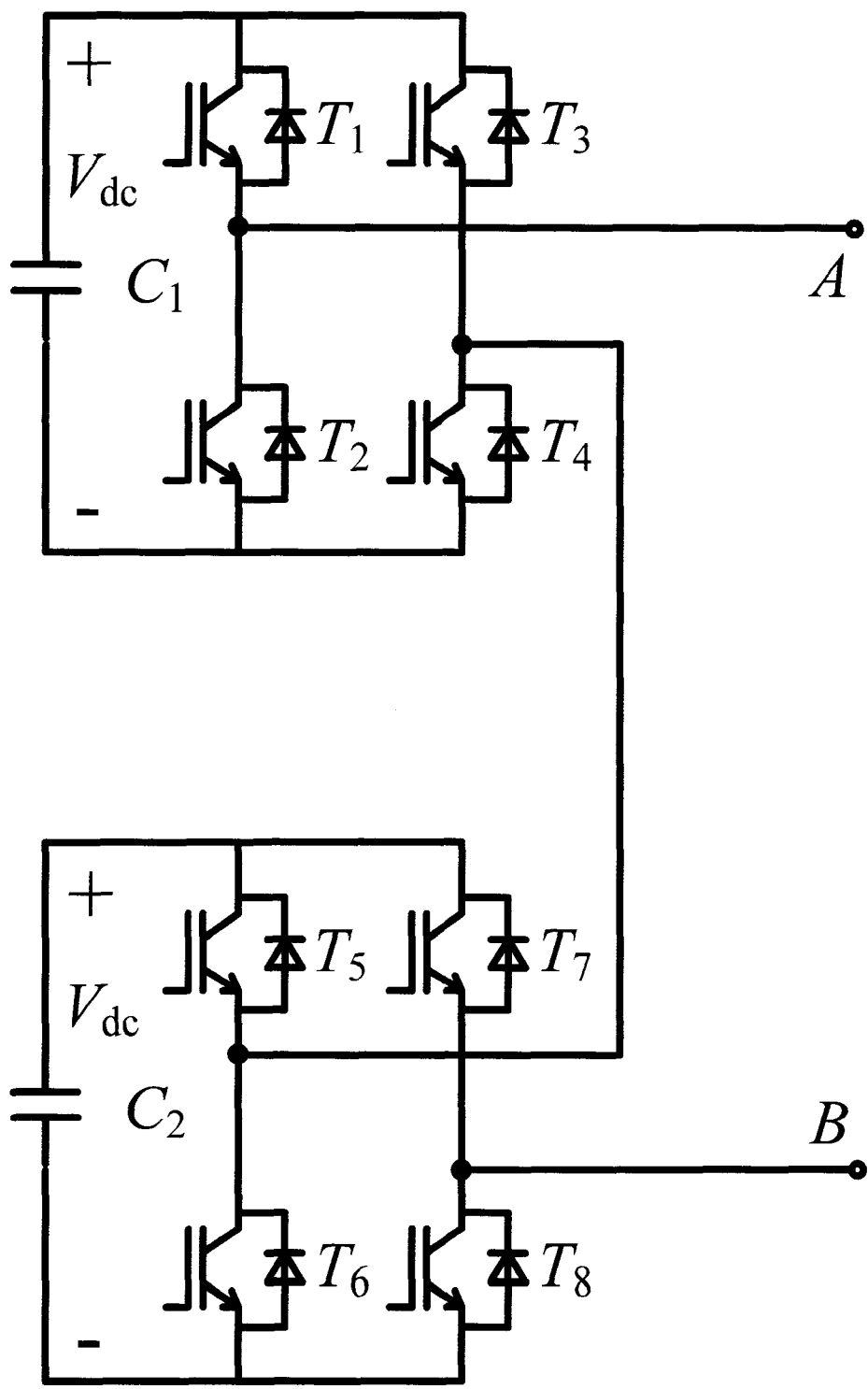
Figure 2:
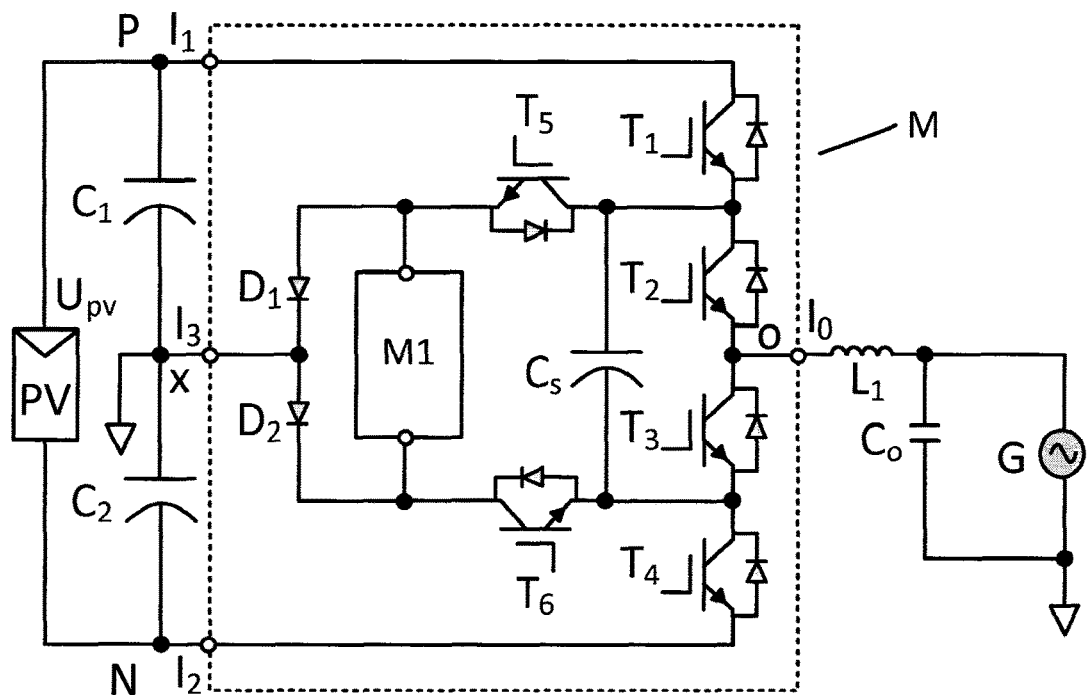
FIG. 2 is the circuit diagram in partial block form of a five-level ANPC converter according to an embodiment of the invention.

FIG. 2 shows the circuit diagram in partial block form of a five-level ANPC converter according to an embodiment of the invention. It has one five-level ANPC converter unit M with three input terminals ($I_1$, $I_2$ and $I_3$) and one output terminal $I_o$. The first input terminal $I_1$ is connected to the positive terminal of the first capacitor $C_1$. The second input terminal $I_2$ is connected to the negative terminal of the second capacitor $C_2$. The third input terminal $I_3$ is connected to the common terminal X of the first capacitor $C_1$ and the second capacitor $C_2$. The output terminal $I_o$ is connected to the common terminal X of the first capacitor $C_1$ and the second capacitor $C_2$ through AC utilities or AC load.

The five-level ANPC converter unit M comprises: six bidirectional switches ($T_1$, $T_2$, $T_3$, $T_4$, $T_5$ and $T_6$), a flying capacitor $C_s$ and two diodes ($D_1$, $D_2$).

The first terminal of the first bidirectional switch $T_1$ is connected to the first input terminal $I_1$ and the second terminal of the first bidirectional switch $T_1$ is connected to both the first terminal of the second bidirectional switch $T_2$ and the positive terminal of the flying capacitor $C_s$. The second terminal of the second bidirectional switch $T_2$ is connected to both the first terminal of the third bidirectional switch $T_3$ and the output terminal $I_o$. The second terminal of the third bidirectional switch $T_3$ is connected to both the first terminal of the fourth bidirectional switch $T_4$ and the negative terminal of the flying capacitor $C_s$. The second terminal of the fourth bidirectional switch $T_4$ is connected to the second input terminal $I_2$. The first terminal of the fifth bidirectional switch $T_5$ is connected to the positive terminal of the flying capacitor $C_s$ and the second terminal of the fifth bidirectional switch $T_5$ is connected to the positive terminal of the first diode $D_1$. The second terminal of the sixth bidirectional switch $T_6$ is connected to the negative terminal of the flying capacitor $C_s$ and the first terminal of the sixth bidirectional switch $T_6$ is connected to the negative terminal of the second diode $D_2$. The negative terminal of the first diode $D_1$ is connected to both the positive terminal of the second diode $D_2$ and the third input terminal $I_3$.

As shown in FIG. 2, the single phase five-level ANPC converter unit M further comprises a switch unit M1 and a filtering inductor $L_1$. The switch unit M1 is connected between the positive terminal of the first diode $D_1$ and the negative terminal of the second diode $D_2$. The filtering inductor $L_1$ is connected between the output terminal $I_o$ and AC utilities or AC load.

Figure 3:
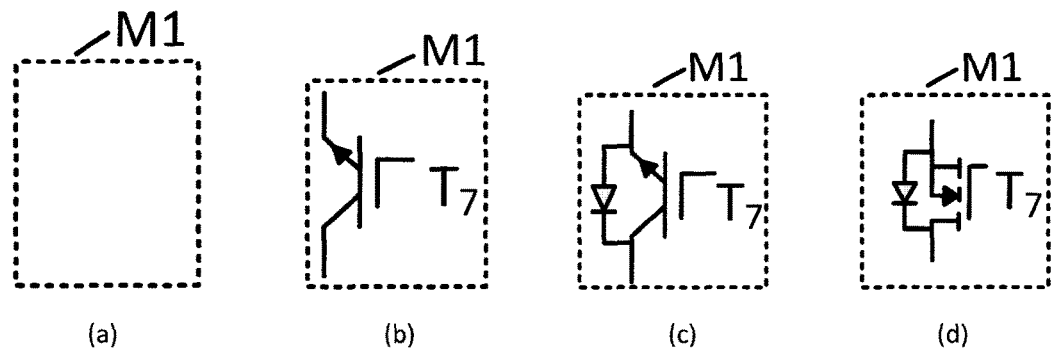
FIG. 3(a) is the first schematic circuit diagram of the switch unit M1 according to an embodiment of the invention.
FIG. 3(b) is the second schematic circuit diagram of the switch unit M1 according to an embodiment of the invention.
FIG. 3(c) is the third schematic circuit diagram of the switch unit M1 according to an embodiment of the invention.
FIG. 3(d) is the fourth schematic circuit diagram of the switch unit M1 according to an embodiment of the invention.

The switch unit M1 has many implementations. There are four examples for the switch unit M1 in FIG. 3. It is nothing in FIG. 3(a). That is to say, the switch unit M1 is absent. As shown in FIG. 3(b), the switch unit M1 comprises one single direction conduction and controllable switch, such as a controllable semiconductor switch IGBT. The first terminal of the switch is connected to the negative terminal of the second diode $D_2$ and the second terminal of the switch is connected to the positive terminal of the first diode $D_1$. The switch unit M1 comprises one bidirectional conduction switch, such as one controllable semiconductor switch IGBT with a reversely parallel diode shown in FIG. 3(c), or one MOSFET where the parallel diode is inherent shown in FIG. 3(d).

Figure 4:
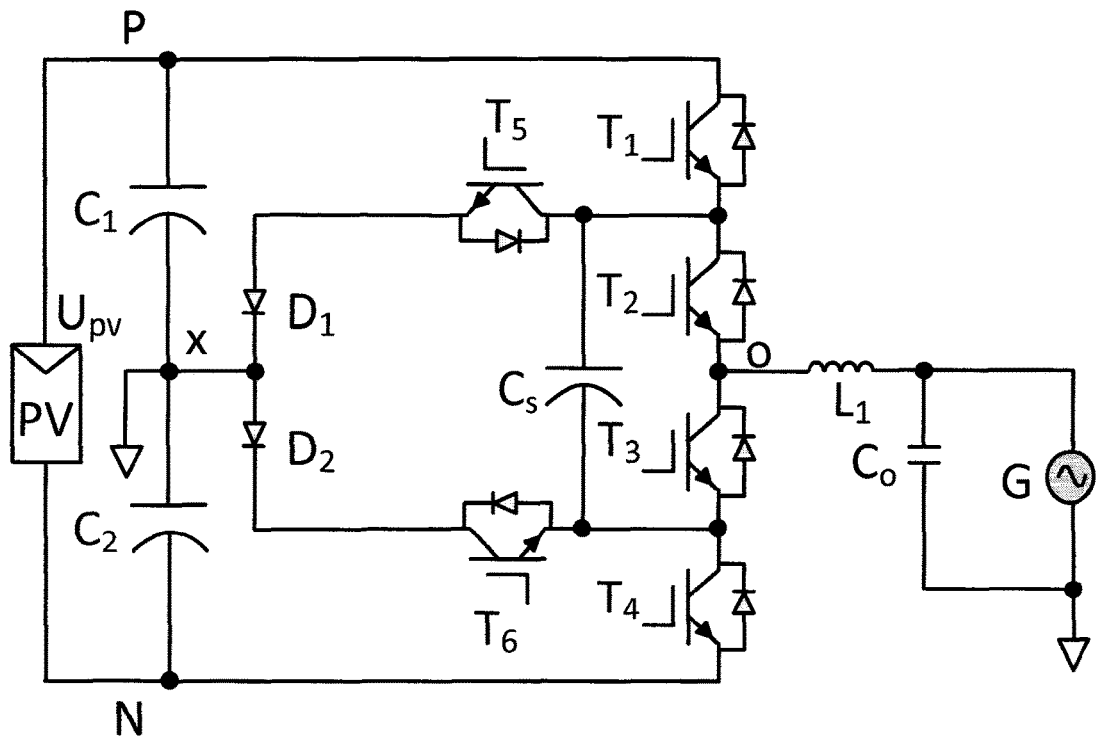
FIG. 4 is the circuit diagram of the five-level ANPC converter with the switch unit M1 shown in FIG. 3(a) according to an embodiment of the invention.

FIG. 4 shows the circuit diagram of the five-level ANPC converter with the switch unit M1 shown in FIG. 3(a) according to an embodiment of the invention. As shown in FIG. 4, the switch unit M1 is absent. For the sake of brevity, the term "six-switch five-level ANPC converter" as used herein is intended to refer to the five-level ANPC converter without the switch unit M1.

To understand how it works, eight working modes of the six-switch five-level ANPC converter are provided. Suppose the total voltage of DC power supply is $U_{PV}$. Both the said first capacitor $C_1$ voltage and the second capacitor $C_2$ voltage are half of $U_{PV}$ as their capacities are equal according to the embodiment. The said flying capacitor $C_s$ is charged by either the first capacitor $C_1$ or the second capacitor $C_2$ and its voltage is kept at one quarter of $U_{PV}$. The current in the filtering inductor $L_1$ flowing from left to right in the accompanied drawings is defined as positive current and the opposite as negative current. The circuits with solid lines in the accompanied drawings work and those with dotted lines don't work.

Figure 5:
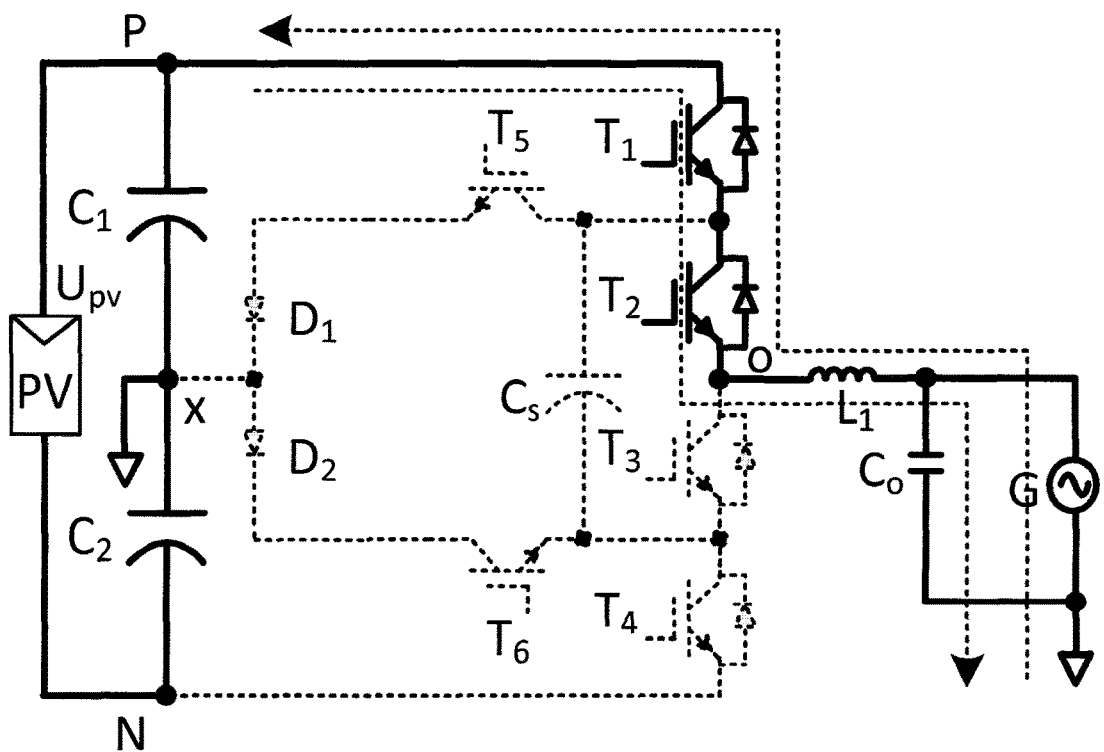
FIG. 5 is the first operating mode diagram of the five-level ANPC converter in FIG. 4 according to an embodiment of the invention.

FIG. 5 shows the first operating mode diagram of the five-level ANPC converter in FIG. 4 according to an embodiment of the invention. The positive current flows as follows: $X \rightarrow C_1 \rightarrow T_1 \rightarrow T_2 \rightarrow L_1 \rightarrow G \rightarrow X$, and the negative current flows: $X \rightarrow G \rightarrow L_1 \rightarrow T_2 \rightarrow T_1 \rightarrow C_1 \rightarrow X$. The output voltage $U_{OX}$ from the converter equals the first capacitor $C_1$ voltage. That is, $U_{OX}=0.5\ U_{PV}$.

Figure 6:
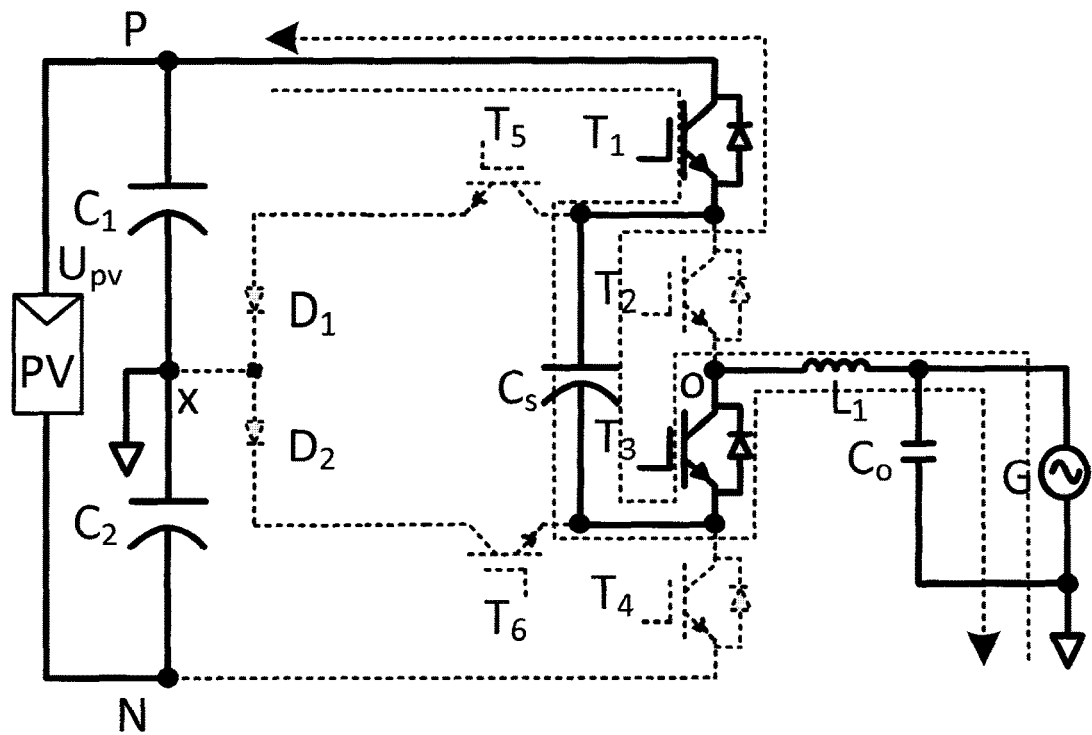
FIG. 6 is the second operating mode diagram of the five-level ANPC converter in FIG. 4 according to an embodiment of the invention.

FIG. 6 shows the second operating mode diagram of the five-level ANPC converter in FIG. 4 according to an embodiment of the invention. The positive current flows as follows: $X \rightarrow C_1 \rightarrow T_1 \rightarrow C_S \rightarrow T_3 \rightarrow L_1 \rightarrow G \rightarrow X$, and the negative current flows: $X \rightarrow G \rightarrow L_1 \rightarrow T_3 \rightarrow C_S \rightarrow T_1 \rightarrow C_1 \rightarrow X$. The output voltage $U_{OX}$ from the converter equals the first capacitor $C_1$ voltage plus the minus flying capacitor $C_s$ voltage. That is, $U_{OX}=0.5U_{PV}+(-0.25U_{PV})=0.25U_{PV}$. The flying capacitor $C_s$ is charged in this mode through positive current, and discharged through negative current.

Figure 7:
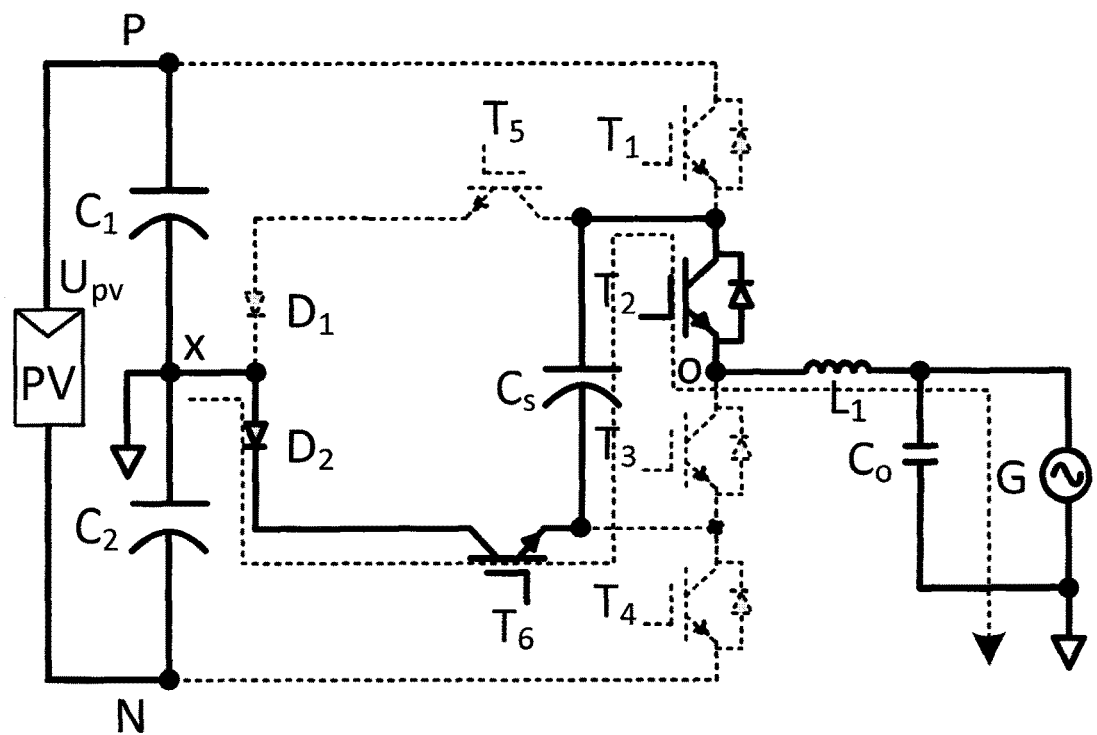
FIG. 7 is the third operating mode diagram of the five-level ANPC converter in FIG. 4 according to an embodiment of the invention.

FIG. 7 shows the third operating mode diagram of the five-level ANPC converter in FIG. 4 according to an embodiment of the invention. The positive current flows as follows: $X \rightarrow D_2 \rightarrow T_6 \rightarrow C_S \rightarrow T_2 \rightarrow L_1 \rightarrow G \rightarrow X$. There is no negative current. The output voltage $U_{OX}$ from the converter equals the flying capacitor $C_s$ voltage. That is, $U_{OX}=0.25\ U_{PV}$. The flying capacitor $C_s$ is discharged through the positive current.

Figure 8:
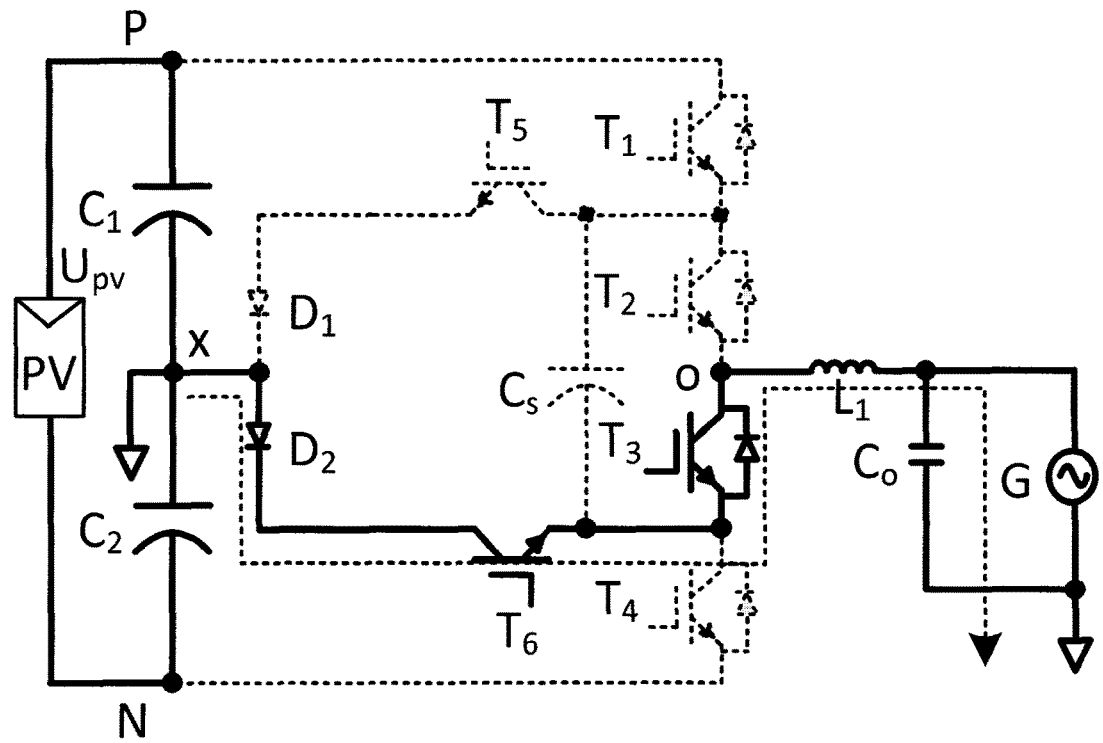
FIG. 8 is the fourth operating mode diagram of the five-level ANPC converter in FIG. 4 according to an embodiment of the invention.

FIG. 8 shows the fourth operating mode diagram of the five-level ANPC converter in FIG. 4 according to an embodiment of the invention. The positive current flows as follows: X→D$_2$→T$_6$→T$_3$→L$_1$→G→X. There is no negative current. The output voltage U$_{OX}$ from the converter equals zero. That is, U$_{OX}$=0.

Figure 9:
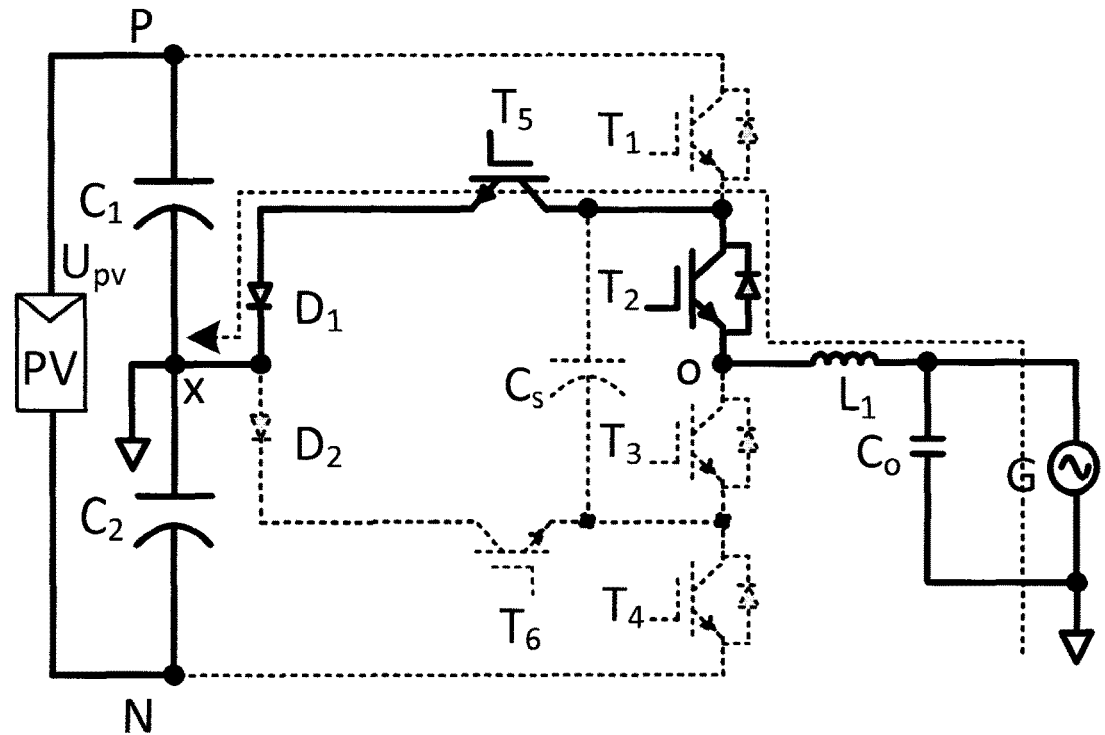
FIG. 9 is the fifth operating mode diagram of the five-level ANPC converter in FIG. 4 according to an embodiment of the invention.

FIG. 9 shows the fifth operating mode diagram of the five-level ANPC converter in FIG. 4 according to an embodiment of the invention. The negative current flows as follows: X→G→L$_1$→T$_2$→T$_5$→D$_1$→X. There is no positive current. The output voltage U$_{OX}$ from the converter equals zero. That is, U$_{OX}$=0.

Figure 10:
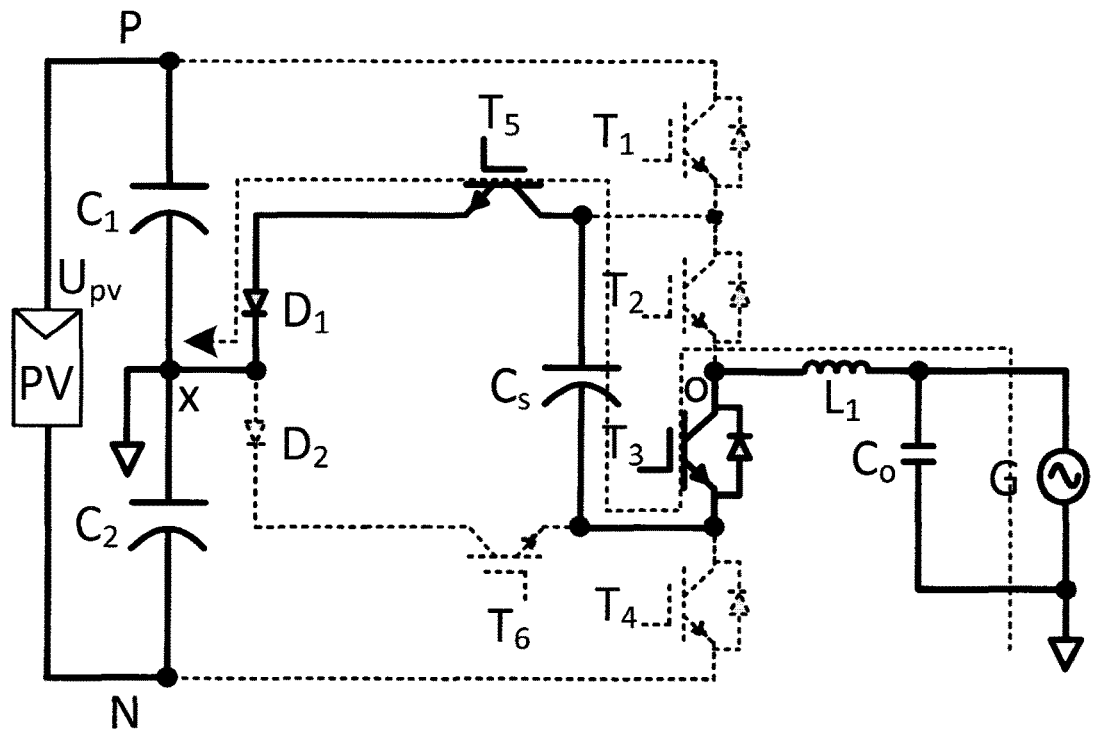
FIG. 10 is the sixth operating mode diagram of the five-level ANPC converter in FIG. 4 according to an embodiment of the invention.

FIG. 10 shows the sixth operating mode diagram of the five-level ANPC converter in FIG. 4 according to an embodiment of the invention. The negative current flows as follows: X→G→L$_1$→T$_3$→C$_S$→T$_5$→D$_1$→X. There is no positive current. The output voltage U$_{OX}$ from the converter equals the minus flying capacitor C$_s$ voltage. That is, U$_{OX}$=−0.25U$_{PV}$. The flying capacitor C$_s$ is discharged through the negative current.

Figure 11:
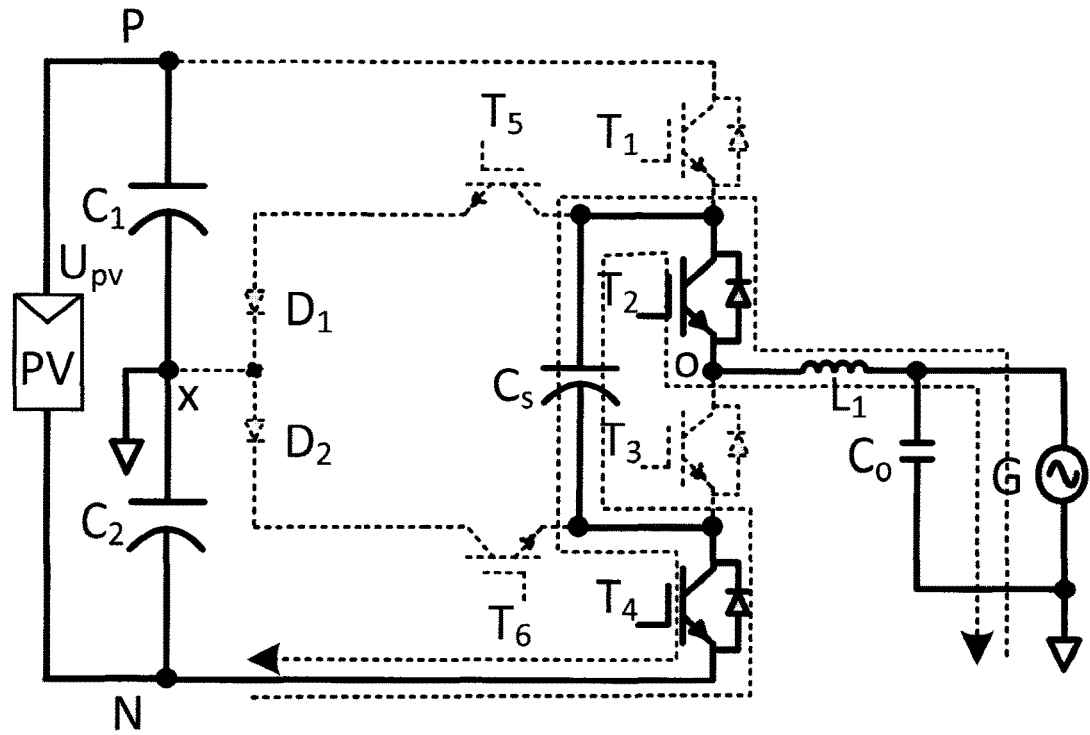
FIG. 11 is the seventh operating mode diagram of the five-level ANPC converter in FIG. 4 according to an embodiment of the invention.

FIG. 11 shows the seventh operating mode diagram of the five-level ANPC converter in FIG. 4 according to an embodiment of the invention. The positive current flows as follows: X→C$_2$→T$_4$→C$_S$→T$_2$→L$_1$→G→X, and the negative current flows: X→G→L$_1$→T$_2$→C$_S$→T$_4$→C$_2$→X. The output voltage U$_{OX}$ from the converter equals the minus second capacitor C$_2$ voltage plus the flying capacitor C$_S$ voltage. That is, U$_{OX}$=(−0.5U$_{PV}$)+0.25U$_{PV}$=−0.25U$_{PV}$. The flying capacitor C$_s$ is discharged in this mode through positive current, and charged through negative current.

Figure 12:
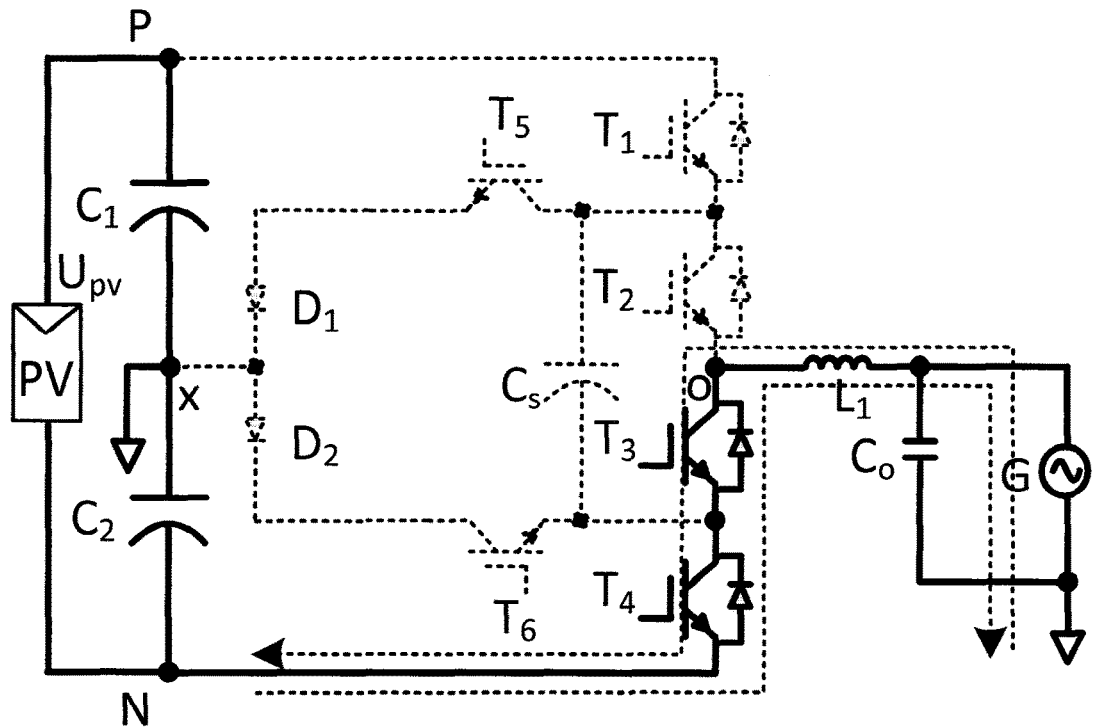
FIG. 12 is the eighth operating mode diagram of the five-level ANPC converter in FIG. 4 according to an embodiment of the invention.

FIG. 12 shows the eighth operating mode diagram of the five-level ANPC converter in FIG. 4 according to an embodiment of the invention. The positive current flows as follows: X→C$_2$→T$_4$→T$_3$→L$_1$→G→X, and the negative current flows: X→G→L$_1$→T$_3$→T$_4$→C$_2$→X. The output voltage U$_{OX}$ from the converter equals the minus second capacitor C$_2$ voltage. That is, U$_{OX}$=−0.5 U$_{PV}$.

The five-level ANPC converter in FIG. 4 works alternately among the eight operating modes. It can be seen from the above description about the operating modes, the output voltage level in the second operating mode is of the same with that in the third operating mode. Similarly, it is the same with the sixth operating mode and the seventh one. For the sake of this description, the two operating modes with the same output voltage level are defined as redundant modes. Although the redundant modes generate the same output voltage level, their effect on the flying capacitor voltage is opposite to each other due to the direction change of the flying capacitor current. This leads to the possibility of regulating the flying capacitor voltage to be a constant value. To get five voltage levels (±0.5U$_{PV}$, ±0.25U$_{PV}$ and 0), the flying capacitor C$_s$ voltage is kept at one quarter of U$_{PV}$.

It can be seen that the current in the filtering inductor L$_1$ flows in single direction during the third, the fourth, the fifth and the sixth operating modes as the diodes (D$_1$ and D$_2$) can work just in single direction.

Figure 13:
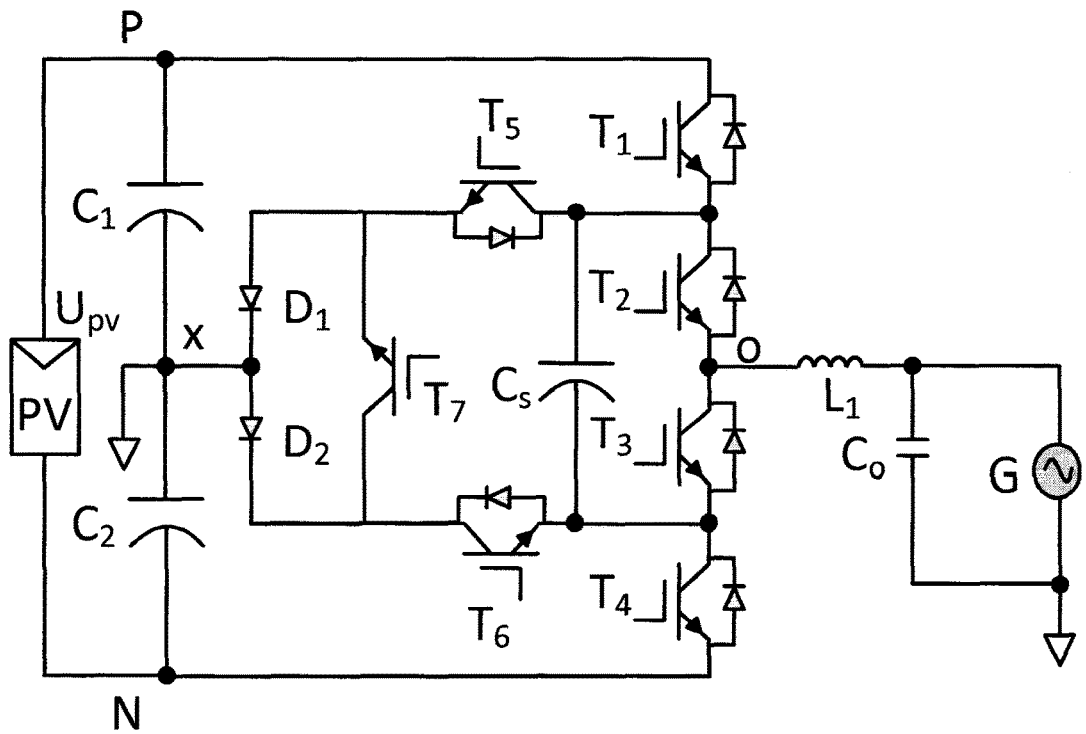
FIG. 13 is the circuit diagram of the five-level ANPC converter with the switch unit M1 shown in FIG. 3(b) according to an embodiment of the invention.

FIG. 13 shows the circuit diagram of the five-level ANPC converter with the switch unit M1 shown in FIG. 3(b) according to an embodiment of the invention. As shown in FIG. 13, the switch unit M1 comprises a controllable semiconductor switch T$_7$. For the sake of brevity, the term "seven-switch five-level ANPC converter" as used herein is intended to refer to the five-level ANPC converter with the switch unit M1.

To understand how it works, eight working modes of the seven-switch five-level ANPC converter are provided.

Figure 14:
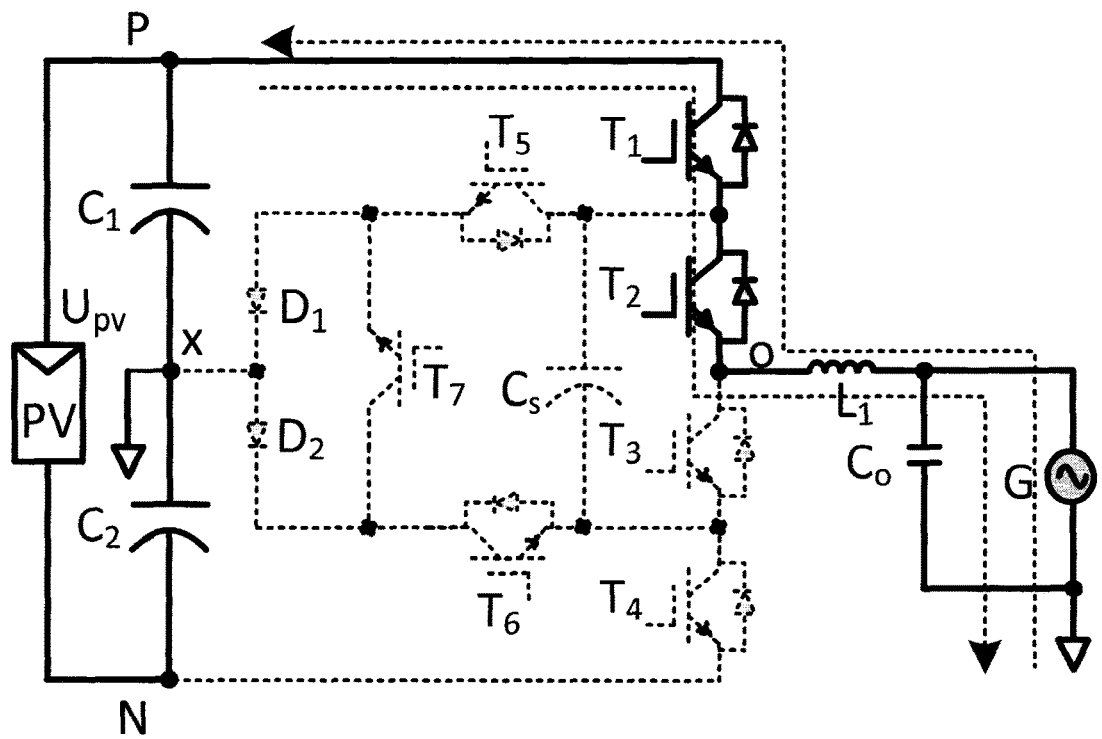
FIG. 14 is the first operating mode diagram of the five-level ANPC converter in FIG. 13 according to an embodiment of the invention.

FIG. 14 shows the first operating mode diagram of the five-level ANPC converter in FIG. 13 according to an embodiment of the invention. The positive current flows as follows: X→C$_1$→T$_1$→T$_2$→L$_1$→G→X, and the negative current flows: X→G→L$_1$→T$_2$→T$_1$→C$_1$→X. The output voltage U$_{OX}$ from the converter equals the first capacitor C$_1$ voltage. That is, U$_{OX}$=0.5 U$_{PV}$.

Figure 15:
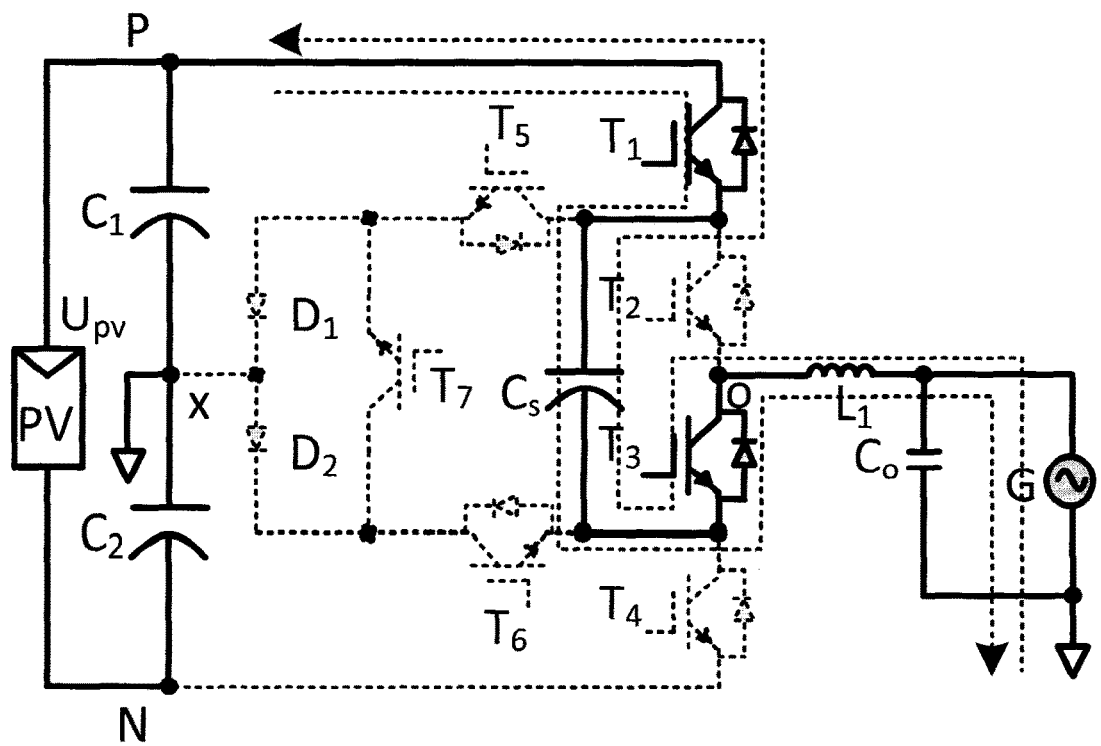
FIG. 15 is the second operating mode diagram of the five-level ANPC converter in FIG. 13 according to an embodiment of the invention.

FIG. 15 shows the second operating mode diagram of the five-level ANPC converter in FIG. 13 according to an embodiment of the invention. The positive current flows as follows: X→C$_1$→T$_1$→C$_S$→T$_3$→L$_1$→G→X, and the negative current flows: X→G→L$_1$→T$_3$→C$_S$→T$_1$→C$_1$→X. The output voltage U$_{OX}$ from the converter equals the first capacitor C$_1$ voltage plus the minus flying capacitor C$_s$ voltage. That is, U$_{OX}$=0.5U$_{PV}$+(−0.25U$_{PV}$)=0.25U$_{PV}$. The flying capacitor C$_s$ is charged in this mode through positive current, and discharged through negative current.

Figure 16:
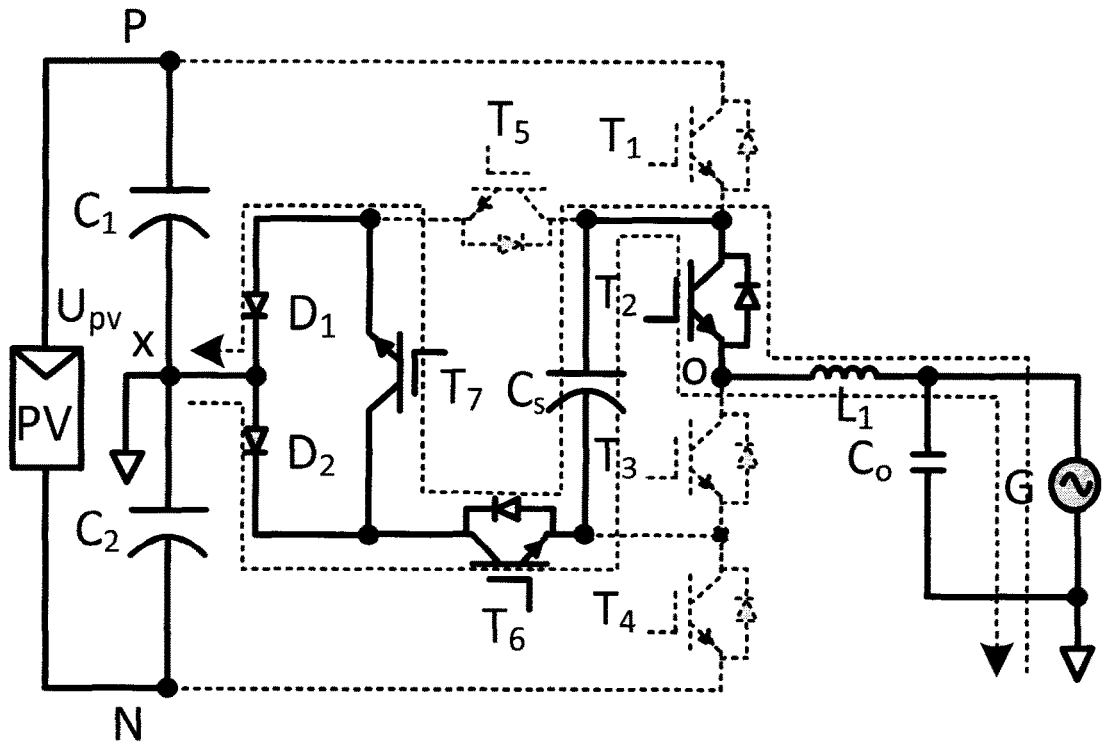
FIG. 16 is the third operating mode diagram of the five-level ANPC converter in FIG. 13 according to an embodiment of the invention.

FIG. 16 shows the third operating mode diagram of the five-level ANPC converter in FIG. 13 according to an embodiment of the invention. The positive current flows as follows: X→D$_2$→T$_6$→C$_S$→T$_2$→L$_1$→G→X, and the negative current flows: X→G→L$_1$→T$_2$→C$_S$→T$_6$→T$_7$→D$_1$→X. The output voltage U$_{OX}$ from the converter equals the flying capacitor C$_s$ voltage. That is, U$_{OX}$=0.25 U$_{PV}$. The flying capacitor C$_s$ is discharged through the positive current and charged through the negative current.

Figure 17:
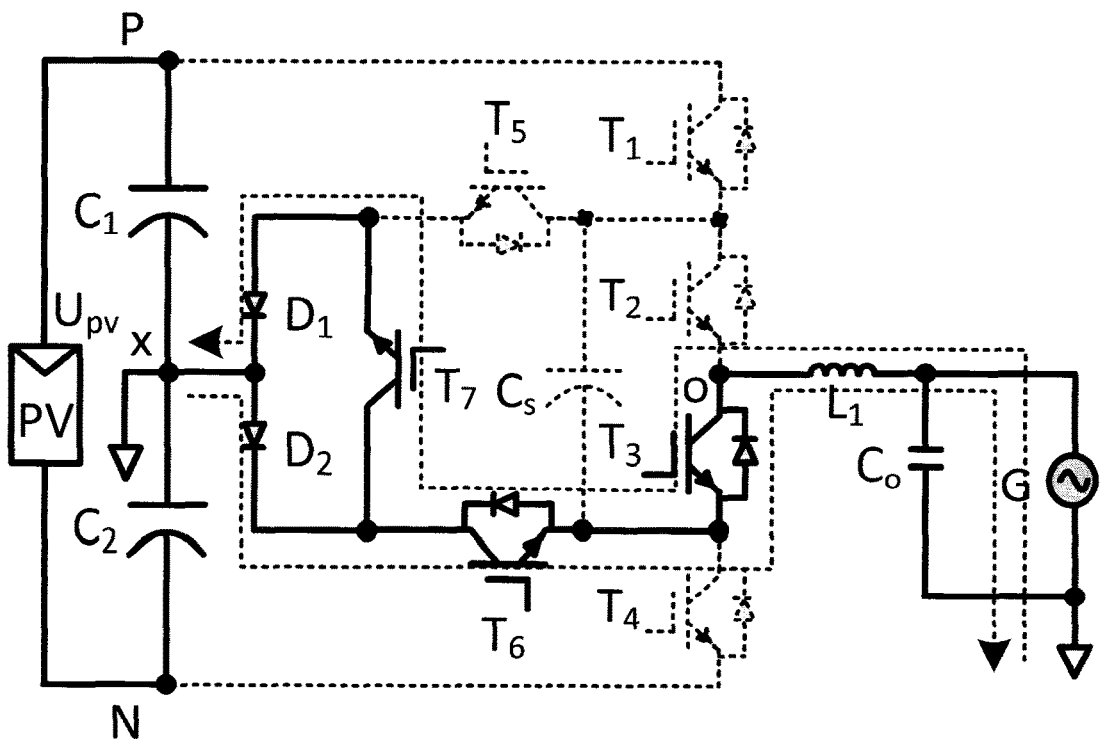
FIG. 17 is the fourth operating mode diagram of the five-level ANPC converter in FIG. 13 according to an embodiment of the invention.

FIG. 17 shows the fourth operating mode diagram of the five-level ANPC converter in FIG. 13 according to an embodiment of the invention. The positive current flows as follows: X→D$_2$→T$_6$→T$_3$→L$_1$→G→X, and the negative current flows: X→G→L$_1$→T$_3$→T$_6$→T$_7$→D$_1$→X. The output voltage U$_{OX}$ from the converter equals zero. That is, U$_{OX}$=0.

Figure 18:
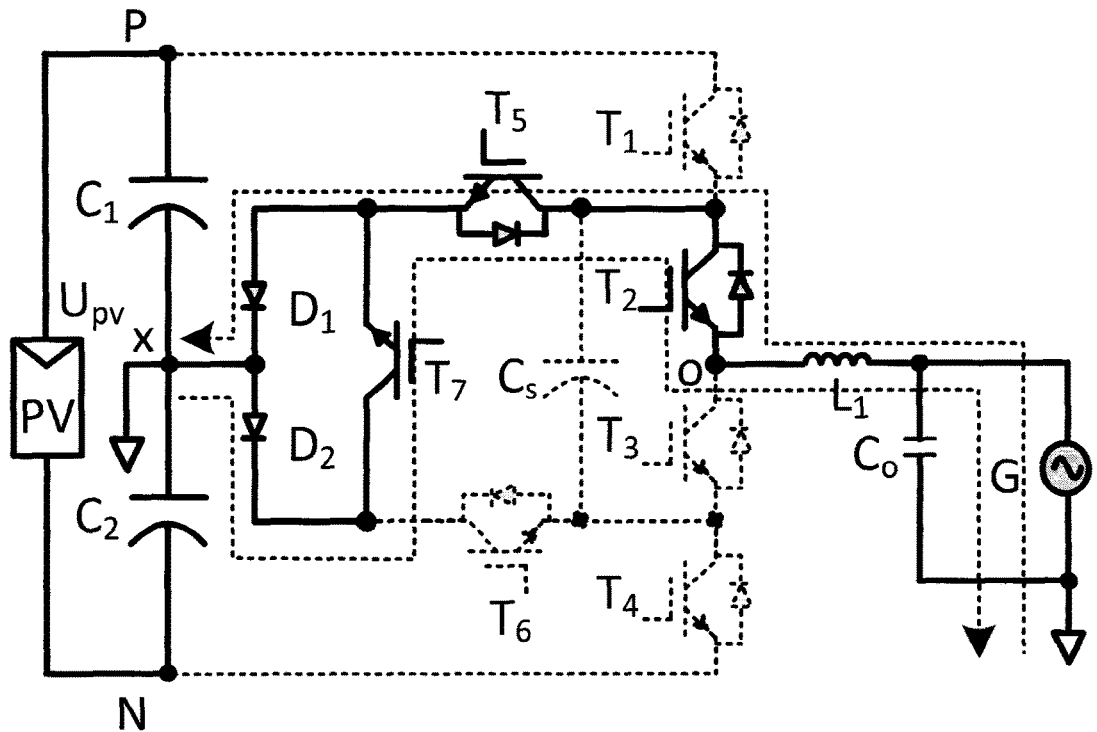
FIG. 18 is the fifth operating mode diagram of the five-level ANPC converter in FIG. 13 according to an embodiment of the invention.

FIG. 18 shows the fifth operating mode diagram of the five-level ANPC converter in FIG. 13 according to an embodiment of the invention. The positive current flows as follows: X→D$_2$→T$_7$→T$_5$→T$_2$→L$_1$→G→X, and the negative current flows: X→G→L$_1$→T$_2$→T$_5$→D$_1$→X. The output voltage U$_{OX}$ from the converter equals zero. That is, U$_{OX}$=0.

Figure 19:
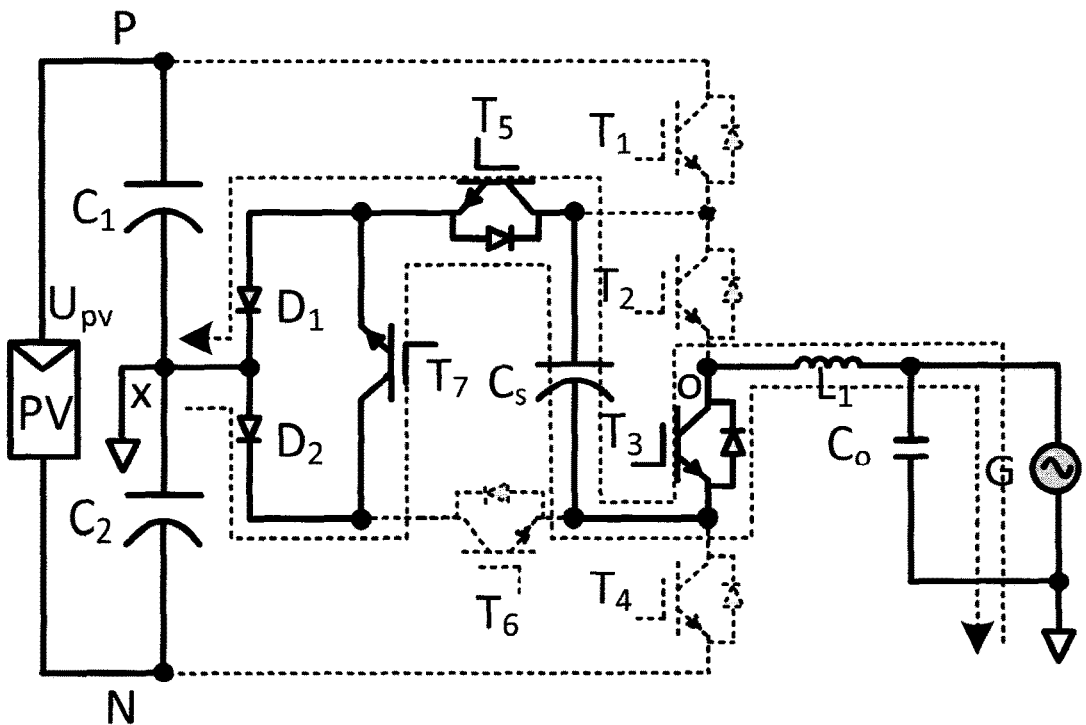
FIG. 19 is the sixth operating mode diagram of the five-level ANPC converter in FIG. 13 according to an embodiment of the invention.

FIG. 19 shows the sixth operating mode diagram of the five-level ANPC converter in FIG. 13 according to an embodiment of the invention. The positive current flows as follows: X→D$_2$→T$_7$→T$_5$→C$_S$→T$_3$→L$_1$→G→X, and the negative current flows: X→G→L$_1$→T$_3$→C$_S$→T$_5$→D$_1$→X. The output voltage U$_{OX}$ from the converter equals the minus flying capacitor C$_s$ voltage. That is, U$_{OX}$=−0.25U$_{PV}$. The flying capacitor C$_s$ is charged through the positive current and discharged through the negative current.

Figure 20:
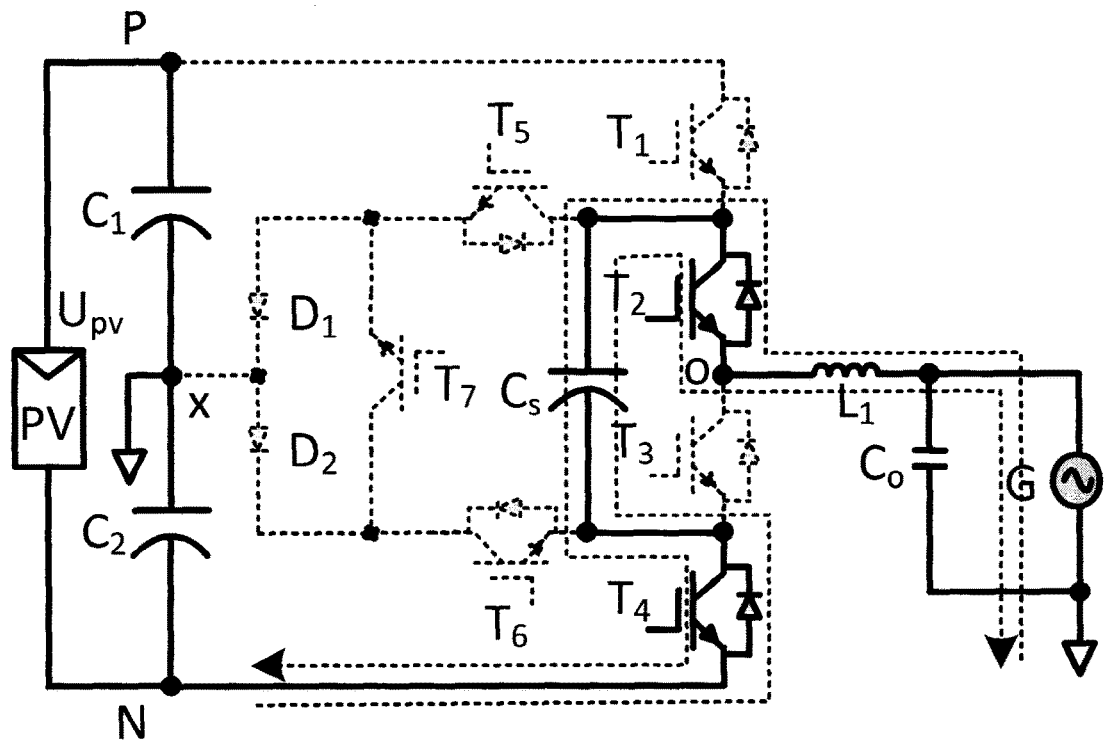
FIG. 20 is the seventh operating mode diagram of the five-level ANPC converter in FIG. 13 according to an embodiment of the invention.

FIG. 20 shows the seventh operating mode diagram of the five-level ANPC converter in FIG. 13 according to an embodiment of the invention. The positive current flows as follows: X→C$_2$→T$_4$→C$_S$→T$_2$→L$_1$→G→X, and the negative current flows: X→G→L$_1$→T$_2$→C$_S$→T$_4$→C$_2$→X. The output voltage U$_{OX}$ from the converter equals the minus second capacitor C$_2$ voltage plus the flying capacitor C$_s$ voltage. That is, U$_{OX}$=(−0.5U$_{PV}$)+0.25U$_{PV}$=−0.25U$_{PV}$. The flying capacitor C$_s$ is discharged in this mode through the positive current, and charged through the negative current.

Figure 21:
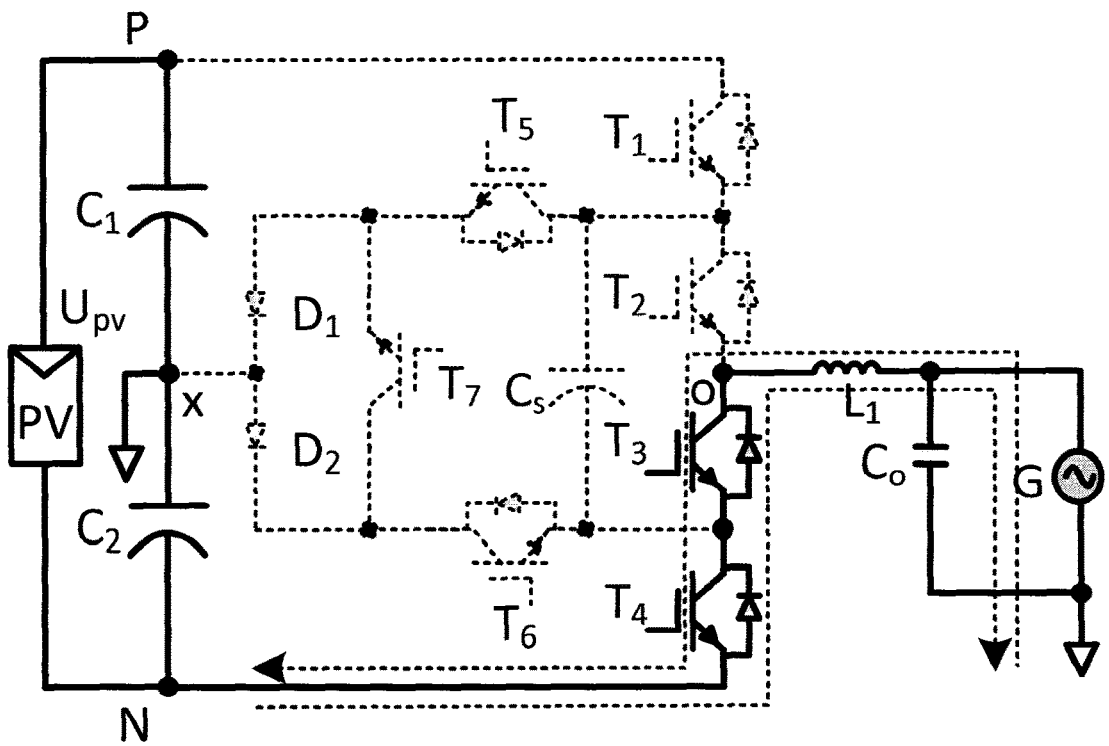
FIG. 21 is the eighth operating mode diagram of the five-level ANPC converter in FIG. 13 according to an embodiment of the invention.

FIG. 21 shows the eighth operating mode diagram of the five-level ANPC converter in FIG. 13 according to an embodiment of the invention. The positive current flows as follows: X→C$_2$→L$_4$→T$_3$→L$_1$→G→X, and the negative current flows: X→G→L$_1$→T$_3$→T$_4$→C$_2$→X. The output voltage U$_{OX}$ from the converter equals the minus second capacitor C$_2$ voltage. That is, U$_{OX}$=−0.5 U$_{PV}$.

The five-level ANPC converter in FIG. 13 works alternately among the eight operating modes above-mentioned by controlling either of the on and off states of each switch to output the expected voltage. For the sake of brevity, the terms "A", "B", "C", "D", "E", "F", "G" and "H" as used herein are intended to respectively refer to the above eight operating modes of the five-level ANPC converter in FIG. 13.

Figure 22:
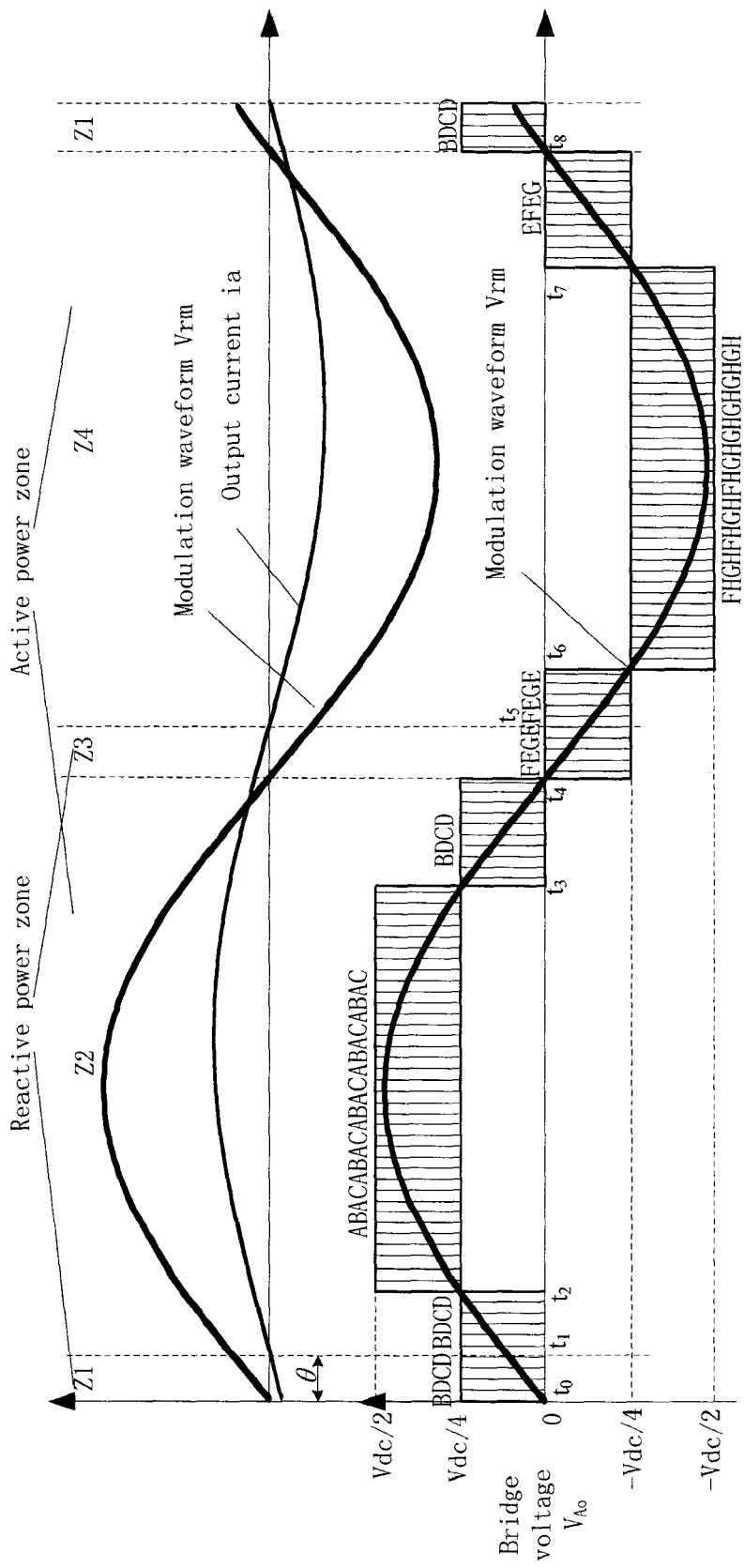
FIG. 22 is the modulation mode diagram of the five-level ANPC converter in FIG. 13 according to an embodiment of the invention.

FIG. 22 shows one example of modulation modes for the seven-switch five-level ANPC converter in FIG. 13.

As shown in FIG. 22, it is in positive half cycle of grid power during the time period of $t_0$-$t_2$. The output voltage $U_{OX}$ from the converter is more than zero but less than $0.25U_{PV}$. The converter works alternately among the second operating mode B, the fourth D, the third C and the fourth D.

It is in positive half cycle of grid power during the time period of $t_2$-$t_3$. The output voltage $U_{OX}$ from the converter is more than $0.25U_{PV}$ but less than $0.5U_{PV}$. The converter works alternately among the first operating mode A, the second B, the first A, and the third C.

It is in positive half cycle of grid power during the time period of $t_3$-$t_4$. The output voltage $U_{OX}$ from the converter is more than zero but less than $0.25U_{PV}$. The converter works alternately among the second operating mode B, the fourth D, the third C and the fourth D.

It is in negative half cycle of grid power during the time period of $t_4$-$t_6$. The absolute value of output voltage $U_{OX}$ from the converter is more than zero but less than $0.25U_{PV}$. The converter works alternately among the sixth operating mode F, the fifth E, the seventh G and the fifth E.

It is in negative half cycle of grid power during the time period of $t_6$-$t_7$. The absolute value of output voltage $U_{OX}$ from the converter is more than $0.25U_{PV}$ but less than $0.5U_{PV}$. The converter works alternately among the sixth operating mode F, the eighth H, the seventh G and the eighth H.

It is in negative half cycle of grid power during the time period of $t_7$-$t_8$. The absolute value of output voltage $U_{OX}$ from the converter is more than zero but less than $0.25U_{PV}$. The converter works alternately among the fifth operating mode E, the sixth F, the fifth E and the seventh G.

Note that the switch $T_7$ works during the third, the fourth, the fifth and the sixth operating modes and it doesn't during the other four operating modes for the seven-switch five-level ANPC converter. For the third and the sixth operating modes, the voltage and current through the switch $T_7$ are not in phase. That is to say, only reactive power is delivered through the switch 17 at that time. For the fourth and the fifth operating modes, both the output voltages $U_{OX}$ from the converter equal zero. It is possible to make only reactive power delivered through the switch $T_7$. As only reactive current is flowing through the switch $T_7$ in the seven-switch five-level ANPC converter provided in the invention, the switch $T_7$ with low rating current can be selected.

It can be seen that the first, the second, the seventh and the eighth operating modes of the seven-switch five-level ANPC converter are the same with those of the six-switch five-level ANPC converter. For the other four operating modes, there are bidirectional current flowing in the seven-switch five-level ANPC converter because the switch $T_7$ works while there is only single direction current flowing in the six-switch five-level ANPC converter. The switch unit M1 provides an extra current path so that the current in the filtering inductor $L_1$ flows in both directions in each operating mode. So the seven-switch five-level ANPC converter is capable of operating under any power factor conditions.

The number of the semiconductor controllable switches, capacitors and/or diodes in both the six-switch five-level ANPC converter and the seven-switch five-level ANPC converter in the invention is smaller than that of the present five-level converter, so it reduces cost. It also solves the problem of mid-point voltage balance of the two series capacitors connected in parallel to DC power supply taking advantage of the symmetry of grid voltage absolute value in two half cycles.

Figure 23:
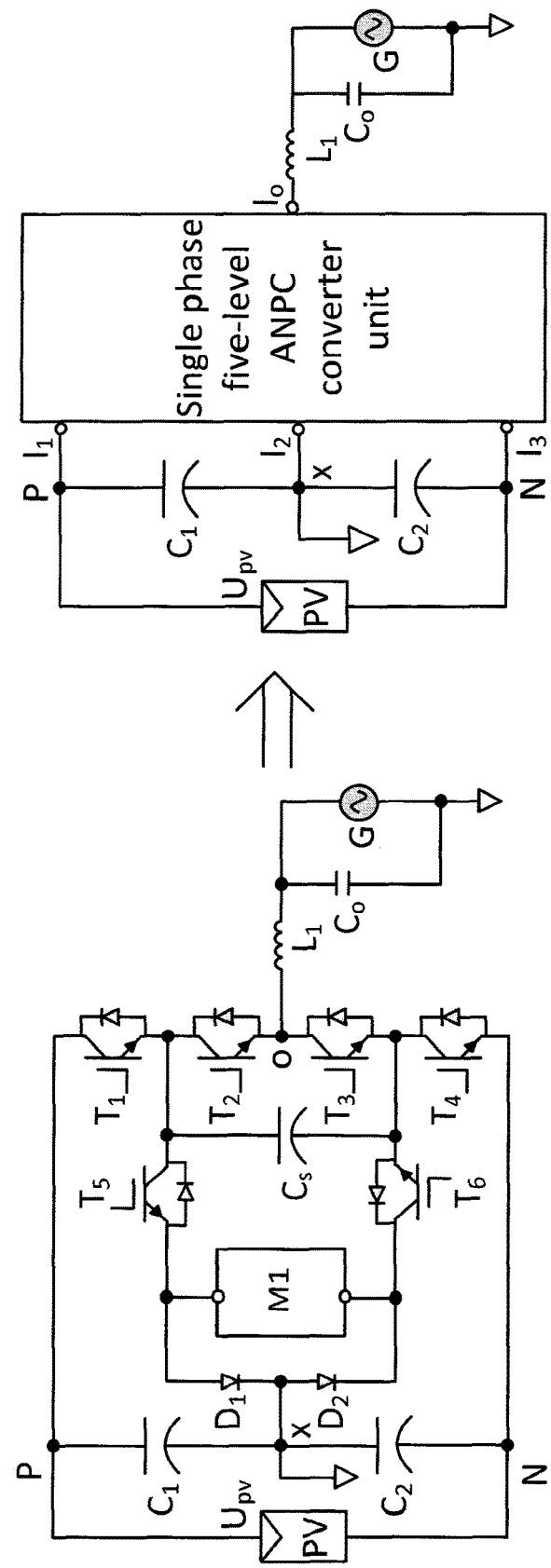
FIG. 23 is an equivalent block diagram of the single phase five-level ANPC converter in FIG. 2 according to an embodiment of the invention.

FIG. 23 shows an equivalent block diagram of the single phase five-level ANPC converter including the six-switch five-level ANPC converter and the seven-switch five-level ANPC converter.

Figure 24:
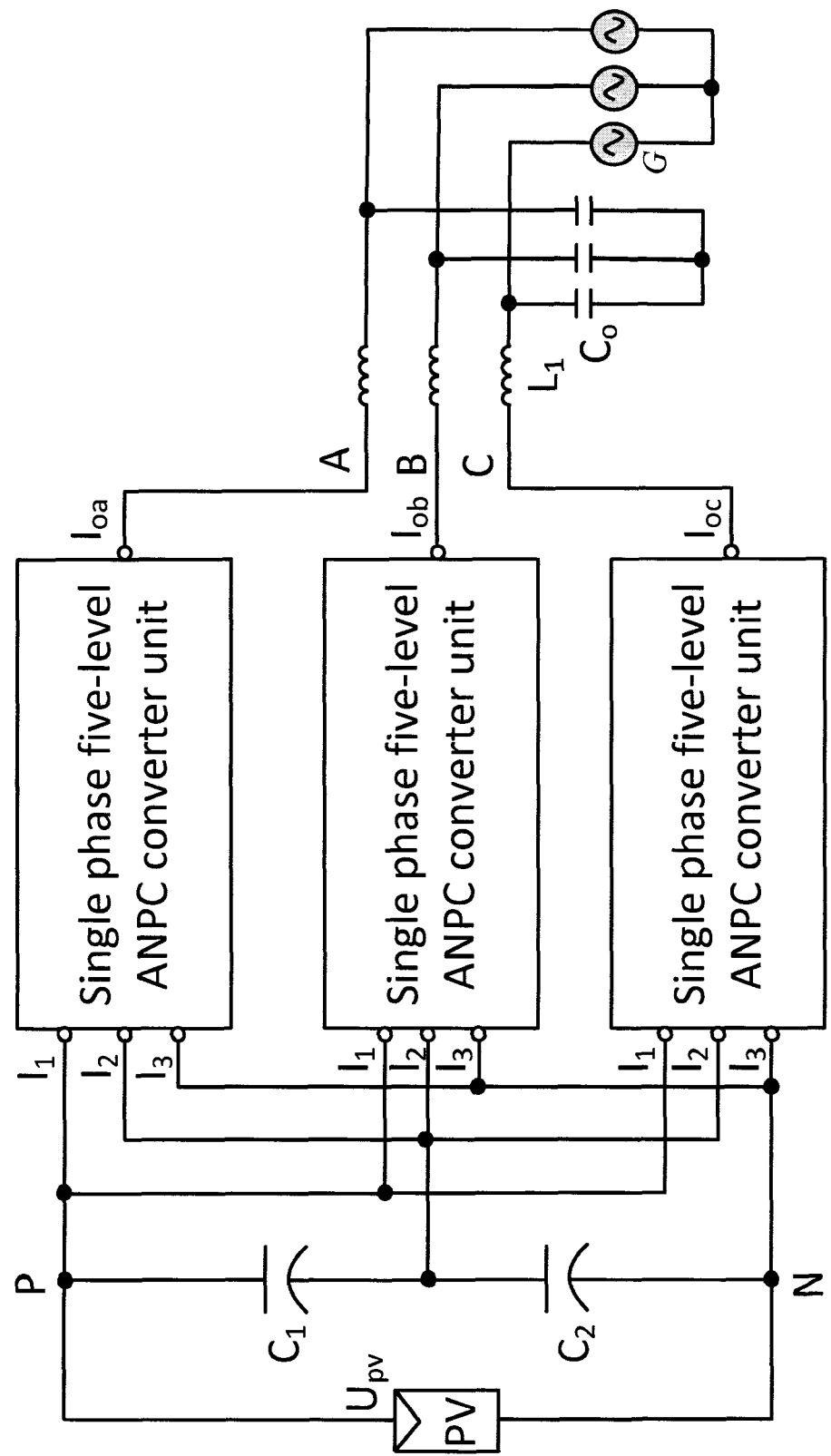
FIG. 24 is the circuit diagram in partial block form of a three-phase five-level ANPC converter according to an embodiment of the invention.

FIG. 24 is the circuit diagram in partial block form of a three phase five-level ANPC converter based on the equivalent circuit in FIG. 23. As shown in FIG. 24, it comprises three single phase five-level ANPC converter units. The three single phase five-level ANPC converter units are connected in parallel at their input sides. That is to say, all the first input terminals $I_1$ are connected to the positive terminal of the first capacitor $C_1$; all the second input terminals 12 are connected to the negative terminal of the second capacitor $C_2$; and all the third input terminals $I_3$ are connected to the common terminal of the first capacitor $C_1$ and the second capacitor $C_2$. The three output terminals of the three single phase five-level ANPC converter units are respectively connected to three phases of AC utilities or AC load.

The three single phase five-level ANPC converter units with the same circuits are preferred as it is more flexible from manufacturing point of view. For example, they all use the single phase five-level ANPC converter unit shown in FIG. 4.

Each embodiment in the part of the detailed description of the embodiments goes forward one by one. The differences among the embodiments are focused on, and it is easy to be understood the same or similar among all the embodiments by making a cross-reference.

Note that the relationship terms like "first", "second" and so on are used in the invention just to separate one thing or operation from the other and not to indicate any real relationship or sequence among them.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A single phase five-level active neutral-point clamped converter unit with three input terminals and one output terminal, comprising: a flying capacitor, two diodes, and only six bidirectional switches;
   wherein a first terminal of a first bidirectional switch is connected to a first input terminal;
   a second terminal of the first bidirectional switch is connected to both a first terminal of a second bidirectional switch and a positive terminal of the flying capacitor;
   a second terminal of the second bidirectional switch is connected to both a first terminal of a third bidirectional switch and the output terminal;
   a second terminal of the third bidirectional switch is connected to both a first terminal of a fourth bidirectional switch and a negative terminal of the flying capacitor;
   a second terminal of the fourth bidirectional switch is connected to a second input terminal;
   a first terminal of a fifth bidirectional switch is connected to the positive terminal of the flying capacitor;
   a second terminal of the fifth bidirectional switch is connected to a positive terminal of a first diode;

a second terminal of a sixth bidirectional switch is connected to the negative terminal of the flying capacitor;
a first terminal of the sixth bidirectional switch is connected to a negative terminal of a second diode;
a negative terminal of the first diode is connected to both a positive terminal of the second diode and a third input terminal.

2. The single phase five-level active neutral-point clamped converter unit of claim 1, further comprising a switch unit;
wherein the switch unit is connected between the positive terminal of the first diode and the negative terminal of the second diode.

3. The single phase five-level active neutral-point clamped converter unit of claim 2, wherein the switch unit comprises one single direction conduction and controllable switch;
wherein a first terminal of the single direction conduction and controllable switch is connected to the negative terminal of the second diode and a second terminal of the single direction conduction and controllable switch is connected to the positive terminal of the first diode.

4. The single phase five-level active neutral-point clamped converter unit of claim 3, wherein the single direction conduction and controllable switch is an IGBT.

5. The single phase five-level active neutral-point clamped converter unit of claim 3 and two DC power supplies connected serially;
wherein the first input terminal is connected to a positive terminal of a first DC power supply;
the second input terminal is connected to a negative terminal of a second DC power supply;
the third input terminal is connected to a common terminal of the two DC power supplies;
the output terminal is connected to the common terminal of the two DC power supplies through an AC utility or an AC load.

6. The single phase five-level active neutral-point clamped converter unit of claim 3, wherein three said single phase five-level active neutral-point clamped converter units are connected together in a three-phase configuration with two DC power supplies connected serially;
wherein all first input terminals of the three single phase five-level active neutral-point clamped converter units are connected to a positive terminal of a first DC power supply;
all second input terminals of the three single phase five-level active neutral-point clamped converter units are connected to a negative terminal of a second DC power supply;
all third input terminals of the three single phase five-level active neutral-point clamped converter units are connected to a common terminal of the two power supplies;
the output terminals of the three single phase five-level active neutral-point clamped converter units are respectively connected to first, second, and third phases of an AC utility or an AC load.

7. The single phase five-level active neutral-point clamped converter unit of claim 2, wherein the switch unit comprises one bidirectional conduction switch.

8. The single phase five-level active neutral-point clamped converter unit of claim 7, wherein the bidirectional conduction switch is one controllable semiconductor IGBT with a reversely parallel diode, or one MOSFET where the parallel diode is inherent.

9. The single phase five-level active neutral-point clamped converter unit of claim 8 and two DC power supplies connected serially;
wherein the first input terminal is connected to a positive terminal of a first DC power supply;
the second input terminal is connected to a negative terminal of a second DC power supply;
the third input terminal is connected to a common terminal of the two DC power supplies;
the output terminal is connected to the common terminal of the two DC power supplies through an AC utility or an AC load.

10. The single phase five-level active neutral-point clamped converter unit of claim 8, wherein three said single phase five-level active neutral-point clamped converter units are connected together in a three-phase configuration with two DC power supplies connected serially;
wherein all first input terminals of the three single phase five-level active neutral-point clamped converter units are connected to a positive terminal of a first DC power supply;
all second input terminals of the three single phase five-level active neutral-point clamped converter units are connected to a negative terminal of a second DC power supply;
all third input terminals of the three single phase five-level active neutral-point clamped converter units are connected to a common terminal of the two power supplies;
the output terminals of the three single phase five-level active neutral-point clamped converter units are respectively connected to first, second, and third phases of an AC utility or an AC load.

11. The single phase five-level active neutral-point clamped converter unit of claim 7 and two DC power supplies connected serially;
wherein the first input terminal is connected to a positive terminal of a first DC power supply;
the second input terminal is connected to a negative terminal of a second DC power supply;
the third input terminal is connected to a common terminal of the two DC power supplies;
the output terminal is connected to the common terminal of the two DC power supplies through an AC utility or an AC load.

12. The single phase five-level active neutral-point clamped converter unit of claim 7, wherein three said single phase five-level active neutral-point clamped converter units are connected together in a three-phase configuration with two DC power supplies connected serially;
wherein all first input terminals of the three single phase five-level active neutral-point clamped converter units are connected to a positive terminal of a first DC power supply;
all second input terminals of the three single phase five-level active neutral-point clamped converter units are connected to a negative terminal of a second DC power supply;
all third input terminals of the three single phase five-level active neutral-point clamped converter units are connected to a common terminal of the two power supplies;
the output terminals of the three single phase five-level active neutral-point clamped converter units are respectively connected to first, second, and third phases of an AC utility or an AC load.

13. The single phase five-level active neutral-point clamped converter unit of claim 2 and two DC power supplies connected serially;
    wherein the first input terminal is connected to a positive terminal of a first DC power supply;
    the second input terminal is connected to a negative terminal of a second DC power supply;
    the third input terminal is connected to a common terminal of the two DC power supplies;
    the output terminal is connected to the common terminal of the two DC power supplies through an AC utility or an AC load.

14. The single phase five-level active neutral-point clamped converter unit of claim 2, wherein three said single phase five-level active neutral-point clamped converter units are connected together in a three-phase configuration with two DC power supplies connected serially;
    wherein all first input terminals of the three single phase five-level active neutral-point clamped converter units are connected to a positive terminal of a first DC power supply;
    all second input terminals of the three single phase five-level active neutral-point clamped converter units are connected to a negative terminal of a second DC power supply;
    all third input terminals of the three single phase five-level active neutral-point clamped converter units are connected to a common terminal of the two power supplies;
    the output terminals of the three single phase five-level active neutral-point clamped converter units are respectively connected to first, second, and third phases of an AC utility or an AC load.

15. The single phase five-level active neutral-point clamped converter unit of claim 1, further comprising filtering inductor;
    wherein the filtering inductor is connected between the output terminal and an AC utility or an AC load.

16. The single phase five-level active neutral-point clamped converter unit of claim 15 and two DC power supplies connected serially;
    wherein the first input terminal is connected to a positive terminal of a first DC power supply;
    the second input terminal is connected to negative terminal of a second DC power supply;
    the third input terminal is connected to a common terminal of the two DC power supplies;
    the output terminal is connected to the common terminal of the two DC power supplies through the AC utility or the AC load.

17. The single phase five-level active neutral-point clamped converter unit of claim 15, wherein three said single phase five-level active neutral-point clamped converter units are connected together in a three-phase configuration with two DC power supplies connected serially;
    wherein all first input terminals of the three single phase five-level active neutral-point clamped converter units are connected to a positive terminal of a first DC power supply;
    all second input terminals of the three single phase five-level active neutral-point clamped converter units are connected to a negative terminal of a second DC power supply;
    all third input terminals of the three single phase five-level active neutral-point clamped converter units are connected to a common terminal of the two power supplies;
    the output terminals of the three single phase five-level active neutral-point clamped converter units are respectively connected to first, second, and third phases of the AC utility or the AC load.

18. The single phase five-level active neutral-point clamped converter unit of claim 1 and two DC power supplies connected serially;
    wherein the first input terminal is connected to a positive terminal of a first DC power supply;
    the second input terminal is connected to a negative terminal of a second DC power supply;
    the third input terminal is connected to a common terminal of the two power supplies;
    the output terminal is connected to the common terminal of the two power supplies through an AC utility or an AC load.

19. The single phase five-level active neutral-point clamped converter unit of claim 1, wherein three said single phase five-level active neutral-point clamped converter units are connected together in a three-phase configuration with two DC power supplies connected serially;
    wherein all first input terminals of the three single phase five-level active neutral-point clamped converter units are connected to a positive terminal of a first DC power supply;
    all second input terminals of the three single phase five-level active neutral-point clamped converter units are connected to a negative terminal of a second DC power supply;
    all third input terminals of the three single phase five-level active neutral-point clamped converter units are connected to a common terminal of the two DC power supplies;
    the output terminals of the three single phase five-level active neutral-point clamped converter units are respectively connected to first, second, and third phases of an AC utility or an AC load.

\* \* \* \* \*